US006400099B1

(12) United States Patent
Walker

(10) Patent No.: US 6,400,099 B1
(45) Date of Patent: Jun. 4, 2002

(54) ACCELERATED ILLUMINATE RESPONSE SYSTEM FOR LIGHT EMITTING DIODES

(75) Inventor: Steven H. Walker, Camas, WA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/230,853

(22) PCT Filed: Mar. 24, 1998

(86) PCT No.: PCT/US98/05834

§ 371 (c)(1),
(2), (4) Date: Feb. 2, 1999

(87) PCT Pub. No.: WO99/01012

PCT Pub. Date: Jan. 7, 1999

Related U.S. Application Data

(63) Continuation-in-part of application No. 08/885,486, filed on Jun. 30, 1997, now Pat. No. 6,036,298.

(51) Int. Cl.$^7$ ................................................. G05F 1/00
(52) U.S. Cl. .................. 315/291; 315/360; 315/200 A; 347/10; 347/57; 372/38; 250/552; 359/184; 359/198
(58) Field of Search ............................ 315/200 A, 246, 315/287, 291, 360, 362, 149; 347/1, 5, 10, 57, 75; 250/208.2, 208.3, 216, 552; 359/184, 198, 17; 372/38

(56) References Cited

U.S. PATENT DOCUMENTS

| 4,414,476 A | 11/1983 | Maddox et al. ............. 250/563 |
| 4,493,993 A | 1/1985 | Kanamuller et al. ..... 250/222.1 |
| 4,540,887 A | 9/1985 | Minerd et al. .............. 250/561 |
| 4,617,580 A | 10/1986 | Miyakawa .................. 346/136 |
| 5,119,132 A | 6/1992 | Butler ........................ 355/208 |
| 5,130,531 A | 7/1992 | Ito et al. ..................... 250/216 |
| 5,132,833 A | 7/1992 | Diau .......................... 359/221 |
| 5,139,339 A | 8/1992 | Courtney et al. ........... 356/446 |

(List continued on next page.)

FOREIGN PATENT DOCUMENTS

| DE | 0154397 | 3/1982 |
| EP | 0292957 | 11/1988 |
| EP | 0441965 A1 | 8/1991 |
| JP | 50338199 | 12/1993 |
| JP | 7-314859 | 12/1995 |

OTHER PUBLICATIONS

Michael R. Feldman, "Diffractive optics move into the commercial arena" Laser Focus World, Oct. 1994.
Michael R. Feldman and Adam E. Erlich, "Diffractive Optics Improve Product Design" Photonics Spectra, Sep. 1995.
Von W.S. Ludolf, "Basics of optical transmission technique—A userorientated Introduction—Part 6. Electronic components: Driving stages for optical emitters" Technisches Messen 50 Jahrgang 1983 Heft 2, pp. 49–54.

Primary Examiner—Haissa Philogene
(74) Attorney, Agent, or Firm—Flory L. Martin

(57) ABSTRACT

An accelerated illuminate response system controls a light emitting diode ("LED"), for instance, in an optical sensor system that monitors ink droplets on a print media in an inkjet printing mechanism to adjust future printing for optimal images. A printhead carriage scans an optical sensor across the printed media to determine droplet location, color and hue. The sensor uses an LED to illuminate the media in response to an LED drive signal, and a photodetector to receive light reflected from the media. The LED drive signal first applies a low level pre-warming current, then a high current pulse for a selected duration, and thereafter a normal drive current during a secondary illuminate response until the LED reaches a selected illumination value at or near steady-state conditions. An inkjet printing mechanism having such an optical sensor system is also provided, along with a method of illuminating an LED.

20 Claims, 16 Drawing Sheets

U.S. PATENT DOCUMENTS

| | | | |
|---|---|---|---|
| 5,140,175 A | * 8/1992 | Yagi et al. | 307/270 |
| 5,187,360 A | 2/1993 | Pasco | 250/208.2 |
| 5,283,681 A | 2/1994 | Hoshino et al. | 359/198 |
| 5,329,210 A | 7/1994 | Peterson et al. | 315/246 |
| 5,336,714 A | 8/1994 | Krutak et al. | 524/608 |
| 5,404,020 A | 4/1995 | Cobbs | 250/548 |
| 5,463,648 A | 10/1995 | Gibbs | 372/38 |
| 5,488,223 A | 1/1996 | Austin et al. | 235/375 |
| 5,606,449 A | 2/1997 | Nishiyama | 359/210 |
| 5,633,744 A | 5/1997 | Nakajima | 359/196 |
| 5,671,059 A | 9/1997 | Vincent | 356/402 |
| 5,724,259 A | 3/1998 | Seymour et al. | 364/526 |
| 5,764,251 A | 6/1998 | Hashimoto | 347/16 |
| 5,774,146 A | 6/1998 | Mizutani | 347/43 |
| 5,929,432 A | 7/1999 | Yamakawa | 250/208.1 |
| 6,229,622 B1 | * 5/2001 | Takeda | 358/1.16 |

* cited by examiner

ACCELERATED ILLUMINATE RESPONSE SYSTEM FOR LIGHT EMITTING DIODES

RELATED APPLICATIONS

This is a continuation-in-part application of the U.S. patent application Ser. No. 08/885,486, filed on Jun. 30, 1997 now U.S. Pat. No. 6,036,298, both having the same inventor.

FIELD OF THE INVENTION

The present invention relates generally to an accelerated illuminate response system for controlling a light emitting diode ("LED"), which may be used for monitoring various parameters in an inkjet printing mechanism, for instance, to monitor the type of print media loaded in the printing mechanism, such as paper or transparencies, or to monitor the location of ink droplets on the print media, so the printing mechanism can adjust future printing for optimal images.

BACKGROUND OF THE INVENTION

Inkjet printing mechanisms use cartridges, often called "pens," which shoot drops of liquid colorant, referred to generally herein as "ink," onto a page. Each pen has a printhead formed with very small nozzles through which the ink drops are fired. To print an image, the printhead is propelled back and forth across the page, shooting drops of ink in a desired pattern as it moves. The particular ink ejection mechanism within the printhead may take on a variety of different forms known to those skilled in the art, such as those using piezo-electric or thermal printhead technology. For instance, two earlier thermal ink ejection mechanisms are shown in U.S. Pat. Nos. 5,278,584 and 4,683,481, both assigned to the present assignee, Hewlett-Packard Company. In a thermal system, a barrier layer containing ink channels and vaporization chambers is located between a nozzle orifice plate and a substrate layer. This substrate layer typically contains linear arrays of heater elements, such as resistors, which are energized to heat ink within the vaporization chambers. Upon heating, an ink droplet is ejected from a nozzle associated with the energized resistor. By selectively energizing the resistors as the printhead moves across the page, the ink is expelled in a pattern on the print media to form a desired image (e.g., picture, chart or text).

To clean and protect the printhead, typically a "service station" mechanism is mounted within the printer chassis so the printhead can be moved over the station for maintenance. For storage, or during non-printing periods, the service stations usually include a capping system which hermetically seals the printhead nozzles from contaminants and drying. Some caps are also designed to facilitate priming by being connected to a pumping unit that draws a vacuum on the printhead. During operation, clogs in the printhead are periodically cleared by firing a number of drops of ink through each of the nozzles in a process known as "spitting," with the waste ink being collected in a "spittoon" reservoir portion of the service station. After spitting, uncapping, or occasionally during printing, most service stations have an elastomeric wiper that wipes the printhead surface to remove ink residue, as well as any paper dust or other debris that has collected on the printhead.

To print an image, the printhead is scanned back and forth across a printzone above the sheet, with the pen shooting drops of ink as it moves. By selectively energizing the resistors as the printhead moves across the sheet, the ink is expelled in a pattern on the print media to form a desired image (e.g., picture, chart or text). The nozzles are typically arranged in linear arrays usually located side-by-side on the printhead, parallel to one another, and perpendicular to the scanning direction, with the length of the nozzle arrays defining a print swath or band. That is, if all the nozzles of one array were continually fired as the printhead made one complete traverse through the printzone, a band or swath of ink would appear on the sheet. The width of this band is known as the "swath width" of the pen, the maximum pattern of ink which can be laid down in a single pass. The media is moved through the printzone, typically one swath width at a time, although some print schemes move the media incrementally by for instance, halves or quarters of a swath width for each printhead pass to obtain a shingled drop placement which enhances the appearance of the final image.

Inkjet printers designed for the home market often have a variety of conflicting design criteria. For example, the home market dictates that an inkjet printer be designed for high volume manufacture and delivery at the lowest possible cost, with better than average print quality along with maximized ease of use. With continuing increases in printer performance, the challenge of maintaining a balance between these conflicting design criteria also increases. For example, printer performance has progressed to the point where designs are being considered that use four separate monochromatic printheads, resulting in a total of over 1200 nozzles that produce ink drops so small that they approximate a mist.

Such high resolution printing requires very tight manufacturing tolerances on these new pens; however, maintaining such tight tolerances is often difficult when also trying to achieve a satisfactory manufacturing yield of the new pens. Indeed, the attributes which enhance pen performance dictate even tighter process controls, which unfortunately result in a lower pen yield as pens are scrapped out because they do not meet these high quality standards. To compensate for high scrap-out rates, the cost of the pens which are ultimately sold is increased. Thus, it would be desirable to find a way to economically control pens with slight deviations without sacrificing print quality, resulting in higher pen yields (a lower scrap-out rate) and lower prices for consumers.

Moreover, the multiple number of pens in these new printer designs, as well as the microscopic size of their ink droplets, has made it unreasonable to expect consumers to perform any type of pen alignment procedure. In the past, earlier printers having larger drop volumes printed a test pattern for the consumer to review and then select the optimal pen alignment pattern. Unfortunately, the small droplets of the new pens are difficult to see, and the fine pitch of the printhead nozzles, that is, the greater number of dots per inch ("dpi" rating) laid down during printing, further increases the difficulty of this task. From this predicament, where advances in print quality have rendered consumer pen alignment to be a nearly impossible task, evolved the concept of closed-loop inkjet printing.

In closed loop inkjet printing, sensors are used to determine a particular attribute of interest, with the printer then using the sensor signal as an input to adjust the particular attribute. For pen alignment, a sensor may be used to measure the position of ink drops produced from each printhead. The printer then uses this information to adjust the timing of energizing the firing resistors to bring the resulting droplets into alignment. In such a closed loop system, user intervention is no longer required, so ease of use is maximized.

Closed loop inkjet printing may also increase pen yield, by allowing the printer to compensate for deviations between individual pens, which otherwise would have been scrapped out as failing to meet tight quality control standards. Drop volume is a good example of this type of trade-off. In the past, to maintain hue control the specifications for drop volume had relatively tight tolerances. In a closed loop system, the actual color balance may be monitored and then compensated with the printer firing control system. Thus, the design tolerances on the drop volume may be loosened, allowing more pens to pass through quality control which increases pen yield. A higher pen yield benefits consumers by allowing manufacturers to produce higher volumes, which results in lower pen costs for consumers.

In the past, closed loop inkjet printing systems have been too costly for the home printer market, although they have proved feasible on higher end products. For example, in the DesignJet® 755 inkjet plotter, and the HP Color Copier 210 machine, both produced by the Hewlett-Packard Company of Palo Alto, Calif., the pens have been aligned using an optical sensor. The DesignJet® 755 plotter used an optical sensor which may be purchased from the Hewlett-Packard Company of Palo Alto, Calif., as part no. C3195-60002, referred to herein as the "HP '002" sensor. The HP Color Copier 210 machine uses an optical sensor which may be purchased from the Hewlett-Packard Company as part no. C5302-60014, referred to herein as the "HP '014" sensor. The HP '014 sensor is similar in function to the HP '002 sensor, but the HP '014 sensor uses an additional green light emitting diode (LED) and a more product-specific packaging to better fit the design of the HP Color Copier 210 machine. Both of these higher end machines have relatively low production volumes, but their higher market costs justify the addition of these relatively expensive sensors.

FIG. 12 is a schematic diagram illustrating the optical construction of the HP '002 sensor, with the HP '014 sensor differing from the HP '002 sensor primarily in signal processing. The HP '014 sensor uses two green LEDs to boost the signal level, so no additional external amplification is needed. Additionally, a variable DC (direct current) offset is incorporated into the HP '014 system to compensate for signal drift. The HP '002 sensor has a blue LED B which generates a blue light B1, and a green LED G which generates a green light G1, whereas the HP '014 sensor (not shown) uses two green LEDs. The blue light stream B1 and the green light stream G1 impact along location D on print media M, and then reflect off the media M as light rays B2 and G2 through a lens L, which focuses this light as rays B3 and G3 for receipt by a photodetector P.

Upon receiving the focused light B3 and G3, the photodetector P generates a sensor signal S which is supplied to the printer controller C. In response to the photodetector sensor signal S, and positional data S1 received from an encoder E on the printhead carriage or on the media advance roller (not shown), the printer controller C adjusts a firing signal F sent to the printhead resistors adjacent nozzles N, to adjust the ink droplet output. Due to the spectral reflectance of the colored inks, the blue LED B is used to detect the presence of yellow ink on the media M, whereas the green LED G is used to detect the presence of cyan and magenta ink, with either diode being used to detect black ink. Thus, the printer controller C, given the input signal S from the photodetector P, in combination with encoder position signal S1 from the encoder E, can determine whether a dot or group of dots landed at a desired location in a test pattern printed on the media M.

Historically, blue LEDs have been weak illuminators. Indeed, the designers of the DesignJet® 755 plotter went to great lengths in signal processing strategies to compensate for this frail blue illumination. The HP Color Copier 210 machine designers faced the same problem and decided to forego directly sensing yellow ink, instead using two green LEDs with color mixing for yellow detection. While brighter blue LEDs have been available in the past, they were prohibitively expensive, even for use in the lower volume, high-end products. For example, the blue LED used in the HP '002 sensor had an intensity of 15 mcd ("milli-candles"). To increase the sensor signal from this dim blue light source, a 100× amplifier was required to boost this signal by 100 times. However, since the amplifier was external to the photodetector portion of the HP '002 sensor, this amplifier configuration was susceptible to propagated noise. Moreover, the offset imposed by this 100× amplifier further complicated the signal processing by requiring that the signal be AC (alternating current) coupled. Additionally, a 10-bit A/D (analog-to-digital) signal converter was needed to obtain adequate resolution with this still relatively low signal.

The HP '014 sensor used in the HP Color Copier 210 machine includes the same optics as the HP '002 sensor used in the DesignJet® 755 plotter, however, the HP '014 sensor is more compact, tailored for ease in assembly, and is roughly 40% the size of the HP '002 sensor. Both the HP '002 and '014 sensors are non-pulsed DC (direct current) sensors, that is, the LEDs are turned on and remain on through the entire scan of the sensor across the media. Signal samples are spacially triggered by the state changes of the encoder strip, which provides feedback to the printer controller about the carriage position across the scan. At the relatively low carriage speed used for the optical scanning, the time required to sample the data is small compared to the total time between each encoder state change. To prevent overheating the LEDs during a scan, the DC forward current through the LED is limited. Since illumination increases with increasing forward current, this current limitation to prevent overheating constrains the brightness of the LED to a value less than the maximum possible.

The HP '014 sensor designers avoided the blue LED problem by using a new way to detect yellow ink with green LEDs. Specifically, yellow ink was detected by placing drops of magenta ink on top of a yellow ink bar when performing a pen alignment routine. The magenta ink migrates through yellow ink to the edges of the yellow bar to change spectral reflectance of the yellow bar so the edges of the bar can be detected when illuminated by the green LEDs. Unfortunately, this yellow ink detection scheme has results which are media dependent. That is, the mixing of the two inks (magenta and yellow) is greatly influenced by the surface properties of media. For use in the home printer market, the media may range from a special photo quality glossy paper, down to a brown lunch sack, fabric, or anything in between. While minimum ink migration may occur on the glossy, photo-type media, a high degree of migration will occur through the paper sack or fabric. Thus, ink mixing to determine drop placement becomes quite risky in the home market, because the printer has no way of knowing which type of media has been used during the pen alignment routine.

Another drawback of the HP '002 sensor and the HP '014 sensor is that they both require printing of an elaborate test pattern on the available media followed by monitoring the pattern with the sensors. This test routine takes about five to seven minutes to perform, a duration which is not suitable for the home market. The LEDs used for both of these sensors are turned on and off with field effect transistor (FET) switches. The LEDs are driven at their nominal maximum DC forward current when initially turned on. During printing of the test pattern, the LEDs are allowed to warm up to their optimum operating temperature and peak luminosity, so the LEDs' warm up time has no impact upon the duration of the overall test routine. Additionally, the test pattern wastes a sheet of media, which can be relatively expensive in the home market, such as when photographic quality media is used. Thus, it would be desirable to have a monitoring system which monitors an operator's normal print job and then makes appropriate adjustments to the printing routine.

Thus, it would be desirable to provide an ink drop sensor system that is particularly economical for use in the home printer market so pen alignment and other adjustments may be implemented during printing to provide consumers with fast, easy-to-use, economical inkjet printing mechanisms that produce high quality images.

SUMMARY OF THE INVENTION

According to one aspect of the invention, a method is provided for illuminating a light emitting diode, including the step of applying a high current pulse to the light emitting diode for a selected duration to illuminate the diode. After the selected duration, in a driving step, the light emitting diode is driven with a normal drive current. After the selected duration, the method further includes the step of enduring a secondary illuminate response until illumination of the light emitting diode reaches a selected illumination value.

According to another aspect of the invention, an optical sensing system is provided for sensing ink droplets printed on media by an inkjet printing mechanism. The sensing system includes a light emitting diode directed to illuminate selected portions of the media in response to a drive signal. A photodetecting element is directed to receive light reflected from the illuminated selected portions of the media. The photodetecting element generates an output signal that has an amplitude proportional to the reflectance of the media at the illuminated selected portions. The sensing system also includes a driver that generates the drive signal to apply a high current pulse to the light emitting diode for a selected duration, and thereafter, to apply a normal drive current to the light emitting diode during a secondary illuminate response until illumination of the light emitting diode reaches a selected illumination value while sensing the ink droplets.

According to another aspect of the invention, an inkjet printing mechanism may be provided with such an optical sensing system for controlling a light emitting diode to determine information about print media and/or ink droplets printed on media by the printing mechanism.

An overall goal of present invention is to provide an inkjet printing mechanism having such an accelerated illuminate response system for controlling a light emitting diode sensor system.

A further goal of present invention is to provide a method for optically determining the type of print media loaded in the printing mechanism and/or a characteristic of an inkjet droplet printed on media so future drops may be adjusted by the printing mechanism to produce high quality images without user intervention.

Another goal of the present invention is to provide an accelerated illuminate response system for an inkjet printing mechanism that is lightweight, compact and economical, particularly for use in the home or office.

DETAILED DESCRIPTION OF A PREFERRED EMBODIMENT

Figure 1:
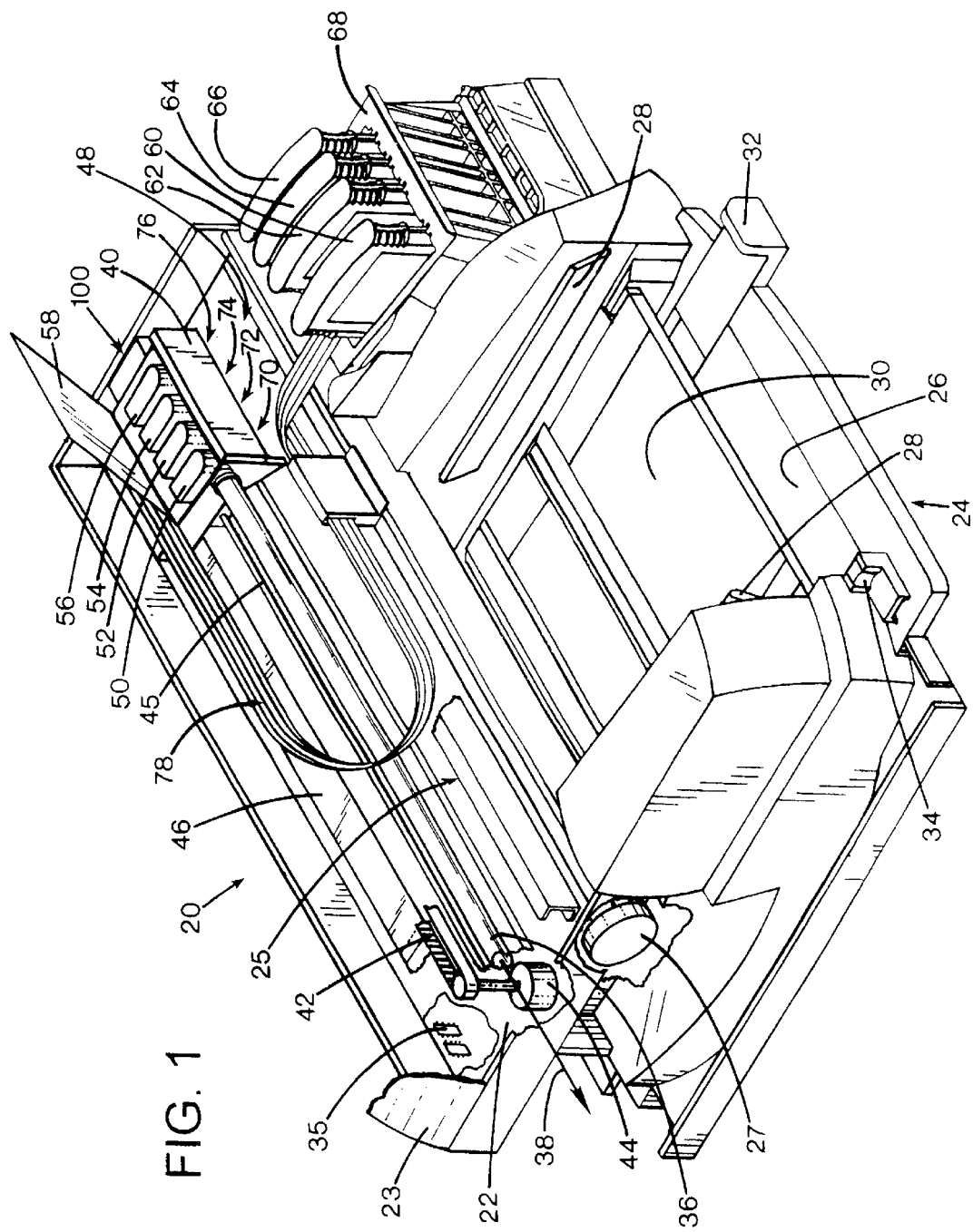
FIG. 1 is a fragmented perspective view of one form of an inkjet printing mechanism, here an inkjet printer, including one form of a monochromatic optical sensing system of the present invention.

FIG. 1 illustrates an embodiment of an inkjet printing mechanism, here shown as an inkjet printer 20, constructed in accordance with the present invention, which may be used for printing for business reports, correspondence, desktop publishing, artwork, and the like, in an industrial, office, home or other environment. A variety of inkjet printing mechanisms are commercially available. For instance, some of the printing mechanisms that may embody the present invention include plotters, portable printing units, copiers, cameras, video printers, and facsimile machines, to name a few. For convenience the concepts of the present invention are illustrated in the environment of an inkjet printer 20 which may find particular usefulness in the home environment.

While it is apparent that the printer components may vary from model to model, the typical inkjet printer 20 includes a chassis 22 surrounded by a housing or casing enclosure 23, the majority of which has been omitted for clarity in viewing the internal components. A print media handling system 24 feeds sheets of print media through a printzone 25. The print media may be any type of suitable sheet material, such as paper, card-stock, envelopes, fabric, transparencies, mylar, and the like, but for convenience, the illustrated embodiment is described using paper as the print medium. The print media handling system 24 has a media input, such as a supply or feed tray 26 into which a supply of media is loaded and stored before printing. A series of conventional media advance or drive rollers (not shown) powered by a motor and gear assembly 27 may be used to move the print media from the supply tray 26 into the printzone 25 for printing. After printing, the media sheet then lands on a pair of retractable output drying wing members 28, shown extended to receive the printed sheet. The wings 28 momentarily hold the newly printed sheet above any previously printed sheets still drying in an output tray portion 30 before retracting to the sides to drop the newly printed sheet into the output tray 30. The media handling system 24 may include a series of adjustment mechanisms for accommodating different sizes of print media, including letter, legal, A-4, envelopes, etc. To secure the generally rectangular media sheet in a lengthwise direction along the media length, the handling system 24 may include a sliding length adjustment lever 32, and a sliding width adjustment lever 34 to secure the media sheet in a width direction across the media width.

The printer 20 also has a printer controller, illustrated schematically as a microprocessor 35, that receives instructions from a host device, typically a computer, such as a personal computer (not shown). Indeed, many of the printer controller functions may be performed by the host computer, by the electronics on board the printer, or by interactions therebetween. As used herein, the term "printer controller 35" encompasses these functions, whether performed by the host computer, the printer, an intermediary device therebetween, or by a combined interaction of such elements. A monitor coupled to the computer host may be used to display visual information to an operator, such as the printer status or a particular program being run on the host computer. Personal computers, their input devices, such as a keyboard and/or a mouse device, and monitors are all well known to those skilled in the art.

The chassis 22 supports a guide rod 36 that defines a scan axis 38 and slideably supports an inkjet printhead carriage 40 for reciprocal movement along the scan axis 38, back and forth across the printzone 25. The carriage 40 is driven by a carriage propulsion system, here shown as including an endless belt 42 coupled to a carriage drive DC motor 44. The carriage propulsion system also has a position feedback system, such as a conventional optical encoder system, which communicates carriage position signals to the controller 35. An optical encoder reader may be mounted to carriage 40 to read an encoder strip 45 extending along the path of carriage travel. The carriage drive motor 44 then operates in response to control signals received from the printer controller 35. A conventional flexible, multi-conductor strip 46 may be used to deliver enabling or firing command control signals from the controller 35 to the printhead carriage 40 for printing, as described further below.

The carriage 40 is propelled along guide rod 36 into a servicing region 48, which may house a service station unit (not shown) that provides various conventional printhead servicing functions, as described in the Background section above. A variety of different mechanisms may be used to selectively bring printhead caps, wipers and primers (if used) into contact with the printheads, such as translating or rotary devices, which may be motor driven, or operated through engagement with the carriage 40. For instance, suitable translating or floating sled types of service station operating mechanisms are shown in U.S. Pat. Nos. 4,853, 717 and 5,155,497, both assigned to the present assignee, Hewlett-Packard Company. A rotary type of servicing mechanism is commercially available in the DeskJet® 850C, 855C, 820C and 870C color inkjet printers (also see U.S. Pat. No. 5,614,930, assigned to the Hewlett-Packard Company), while a translational type of servicing mechanism is commercially available in the DeskJet® 690C and 693C color inkjet printers, all sold by the Hewlett-Packard Company.

In the print zone 25, the media receives ink from an inkjet cartridge, such as a black ink cartridge 50 and three monochrome color ink cartridges 52, 54 and 56, secured in the carriage 40 by a latching mechanism 58, shown open in FIG. 1. The cartridges 50–56 are also commonly called "pens" by those in the art. The black ink pen 50 is illustrated herein as containing a pigment-based ink. While the illustrated color pens 52–56 may contain pigment-based inks, for the purposes of illustration, pens 52–56 are described as each containing a dye-based ink formulation of the colors cyan, yellow and magenta, respectively. It is apparent that other types of inks may also be used in pens 50–56, such as paraffin-based inks, as well as hybrid or composite inks having both dye and pigment characteristics.

The illustrated pens 50–56 each include reservoirs for storing a supply of ink therein. The reservoirs for each pen 50–56 may contain the entire ink supply on board the printer for each color, which is typical of a replaceable cartridge, or they may store only a small supply of ink in what is known as an "off-axis" ink delivery system. The replaceable cartridge systems carry the entire ink supply as the pen reciprocates over the printzone 25 along the scanning axis 38. Hence, the replaceable cartridge system may be considered as an "on-axis" system, whereas systems which store the main ink supply at a stationary location remote from the printzone scanning axis are called "off-axis" systems. In an off-axis system, the main ink supply for each color is stored at a stationary location in the printer, such as four refillable or replaceable main reservoirs 60, 62, 64 and 66, which are received in a stationary ink supply receptacle 68 supported by the chassis 22. The pens 50, 52, 54 and 56 have printheads 70, 72, 74 and 76, respectively, which eject ink delivered via a conduit or tubing system 78 from the stationary reservoirs 60–66 to the on-board reservoirs adjacent the printheads 70–76.

The printheads 70–76 each have an orifice plate with a plurality of nozzles formed therethrough in a manner well known to those skilled in the art. The nozzles of each printhead 70–76 are typically formed in at least one, but typically two linear arrays along the orifice plate. Thus, the term "linear" as used herein may be interpreted as "nearly linear" or substantially linear, and may include nozzle arrangements slightly offset from one another, for example, in a zigzag arrangement. Each linear array is typically aligned in a longitudinal direction perpendicular to the scanning axis 38, with the length of each array determining the maximum image swath for a single pass of the printhead. The illustrated printheads 70–76 are thermal inkjet printheads, although other types of printheads may be used, such as piezoelectric printheads. The thermal printheads 70–76 typically include a plurality of resistors which are associated with the nozzles. Upon energizing a selected resistor, a bubble of gas is formed which ejects a droplet of ink from the nozzle and onto a sheet of paper in the printzone 25 under the nozzle. The printhead resistors are selectively energized in response to firing command control signals received via the multi-conductor strip 46 from the controller 35.

Monochromatic Optical Sensing System

Figure 2:
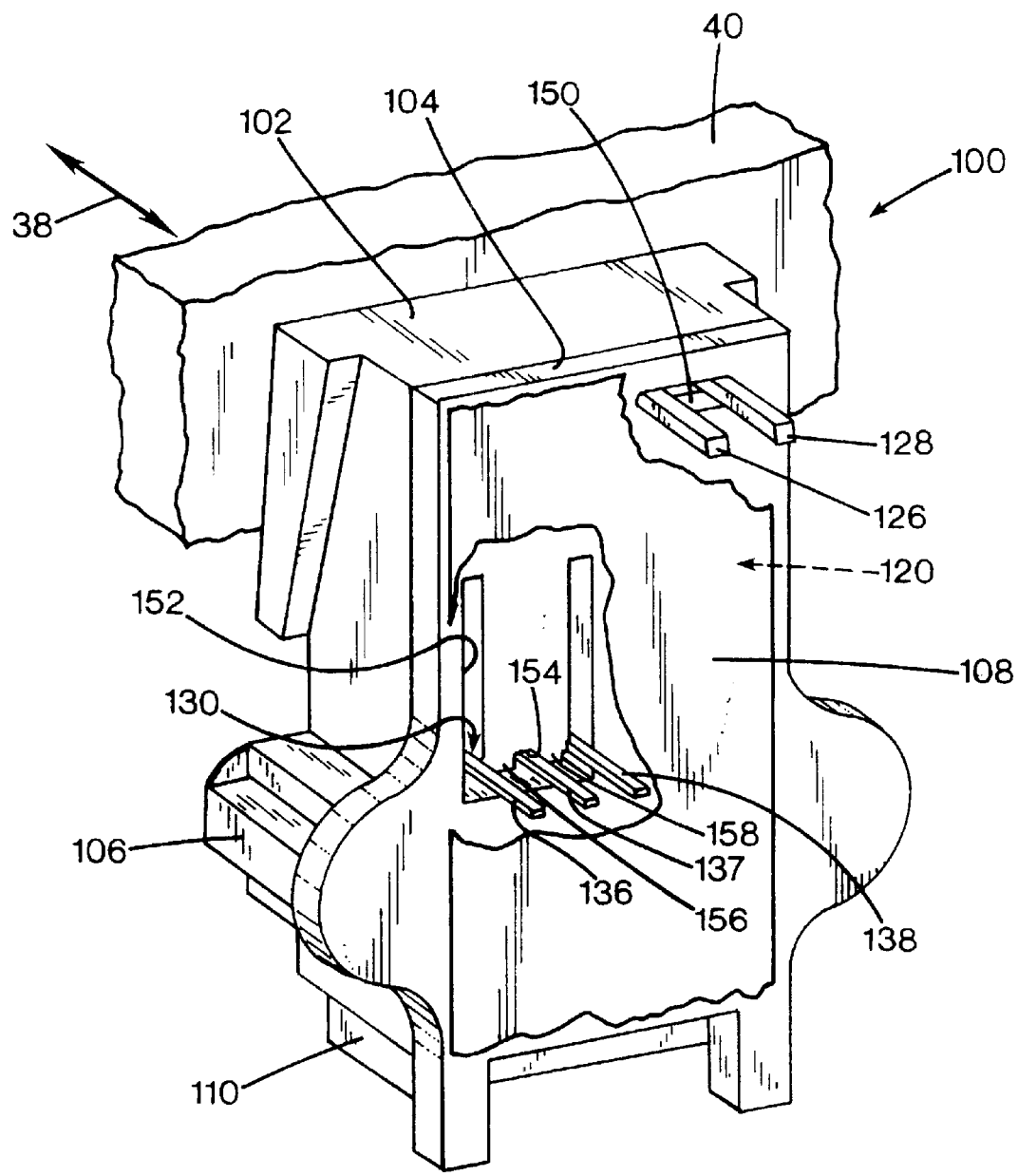
FIG. 2 is an enlarged, fragmented perspective view of a monochromatic optical sensor of the sensing system of FIG. 1, shown mounted to a portion of the printhead carriage.
Figure 3:
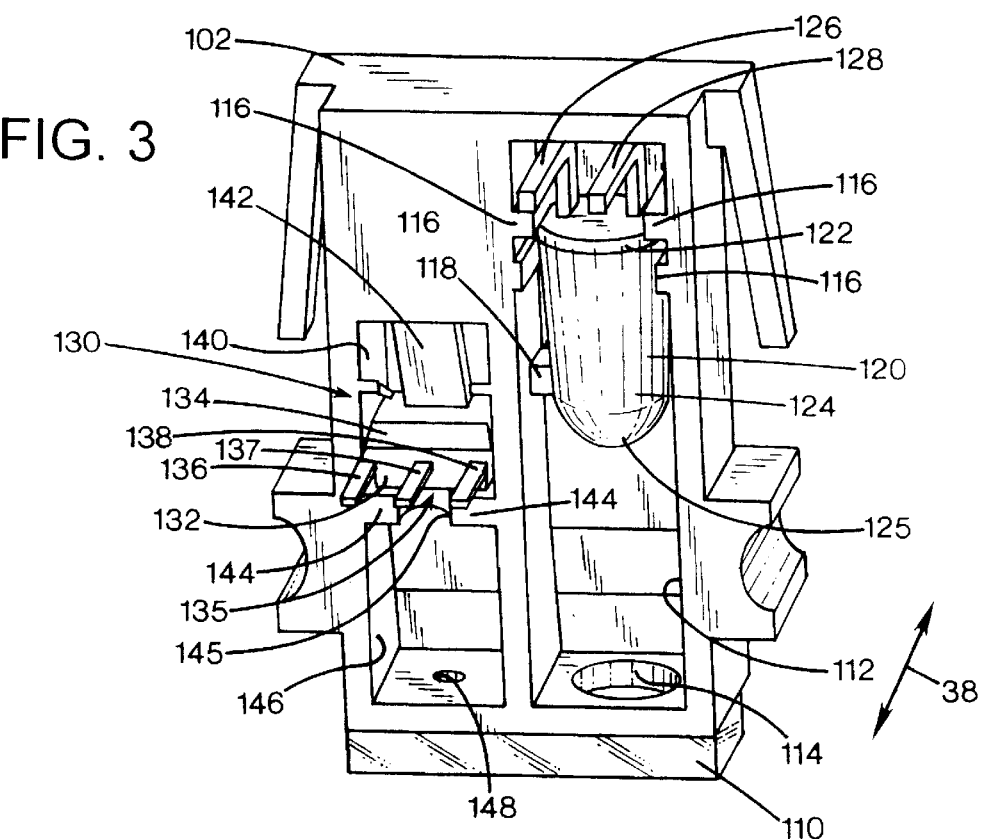
FIG. 3 is a perspective view of the interior of the monochromatic optical sensor of FIG. 2.

FIGS. 2 and 3 illustrate one form of a monochromatic optical sensor 100 constructed in accordance with the present invention. The sensor 100 includes a casing or base unit 102 which is supported by the printhead carriage 40, for instance using a screw attachment, slide and snap fittings, by bonding with an adhesive or constructed integrally therewith, or in a variety of other equivalent ways which are known to those skilled in the art. A cover 104 is attached to the case 102, for instance by a pair of snap fit fingers, such as finger 106 in FIG. 2. Preferably, the casing 102 and the cover 104 are both constructed of an injection molded rigid plastic, although it is apparent other materials may also be suitably employed. Overlying the cover 104 is a flex circuit assembly 108, which may be used to provide power to the sensor, and to deliver sensor signals back to the printer controller 35. The flex circuit 108 may couple the sensor 100 to an electronics portion (not shown) of the carriage 40, with the sensor signals then passing from the carriage 40 through the multi-conductor strip 46, which carries communication signals between the controller 35 and the carriage 40 to fire the printheads 70–76. A lens assembly 110 is gripped between lower portions of the casing 102 and the cover 104, with the lens assembly 100 being described in greater detail below with respect to FIGS. 4–6. Preferably, the rear portion, and/or the side portions of casing 102 define one or more slots (not shown) which receive the lens 110, with the cover 104 then securing the lens 110 within these slots. Alternatively, the lens assembly 110 may be bonded to the casing 102 or otherwise secured thereto in a variety of different ways known to those skilled in the art.

FIG. 3 shows the monochromatic sensor 100 with the cover 104 removed to expose the interior of the casing 102, and the internal components of the sensor. The casing 102 defines an LED (light emitting diode) receiving chamber 112 and an LED output aperture 114 which couples the interior of chamber 112 to a portion of the lens assembly 110. The casing 102 also defines two pair of alignment members 116, and an alignment cradle or trough defining member 118 which cooperate to receive a blue LED 120. A rear flange portion 122 of the blue LED 120 preferably rests against a lower side of each of the alignment members 116, with the trough portion of the support 118 being contoured to receive a package or shell portion 124, adjacent an output lens 125, of the LED 120. Extending from the LED rear flange 122 are two input leads 126 and 128 which are electrically coupled to conductors in the flex circuit 108, for instance by soldering, crimping, or other electrical connection techniques known in the art. One suitable blue LED 120 may be obtained from Panasonic (Matsushita Electronics) of Kyoto, Japan, as part no. LNG992CF9, which is a T-1¾ GaN LED.

The optical sensor 100 also includes an optoelectronic element, such as a photodetector 130 that includes a light sensitive photocell or photodiode 132 which is electrically coupled to an amplifier portion 134 of the photodetector 130. The photodetector 130 also includes input lens 135, which emits light to the light sensitive photocell 132. The photocell 132 is preferably encapsulated as a package fabricated to include the curved lens 135 which concentrates incoming light onto the photocell 132. The photodetector 130 also has three output leads 136, 137 and 138 which couple the output from amplifier 134 to electrical conductors on the flex circuit 108 to supply photodetector sensor signals to the controller 35, via electronics on the carriage 40 and the multi-conductor flex strip 46. Preferably, the photodetector 130 is received within a mounting chamber 140 defined by the casing 102. While a variety of different photodetectors may be used, one preferred photodetector is a light-to-voltage converter, which may be obtained as part no. TSL250, from Texas Instruments of Dallas, Tex.

Preferably, the casing 102 is formed with a spring tab 142 extending downwardly into chamber 140. The spring tab 142 contacts the external casing of the photodetector to push the photodetector 130 against a pair of alignment walls 144, which define a passageway 145 therethrough. The passageway 145 couples the receiving chamber 140 with a focusing chamber 146. The lower portion of casing 102 defines a photodetector input aperture 148 therethrough which couples chamber 146 to a portion of the lens assembly 110. Thus, light from the lens assembly 110 passes on an inbound path through aperture 148, chamber 146, passageway 145, into the photodetector lens 135 to land on the photocell 132. Preferably, the casing 102 is constructed so that the LED chamber 112 is optically isolated from the photodetector chambers 140, 146 to prevent light emitted directly from the blue LED 120 from being perceived by the photocell 132. Thus, the outbound light path of the LED 120 is optically isolated from the inbound light path of the photodetector 130.

As shown in FIG. 2, to couple the LED leads 126, 128 and the photodetector leads 136–137 to the conductors of the flex circuit 108, the cover 104 preferably defines a slot 150 therethrough for the LED leads 128–126 and another slot 152 for the photodetector leads 136–138. To separate the photodetector leads 136, 137 and 138 from one another, preferably the cover 104 defines a recess 154 for receiving lead 137, with the recess being bounded by two notches, with one notch 156 separating leads 136 and 137, and another notch 158 separating leads 137 and 138. It is apparent that the LED lead slot 150 may also be configured with similar notches and recesses if desired to separate lead 126 from lead 128. The sizing and placement of the LED lead slot 150 and the photodetector lead slot 152, as well as their attachment to conductors of flex circuit 108, assist in accurately aligning both the LED 120 and the photodetector 130 for accurate relative alignment and orientation of the optical components, specifically, the LED output lens 125 and the photodetector input lens 135.

Figure 4:
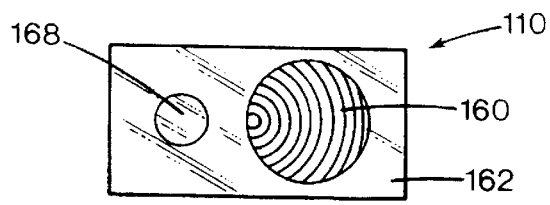
FIG. 4 is top plan view of one form of a lens assembly of the monochromatic optical sensor of FIG. 2.
Figure 5:
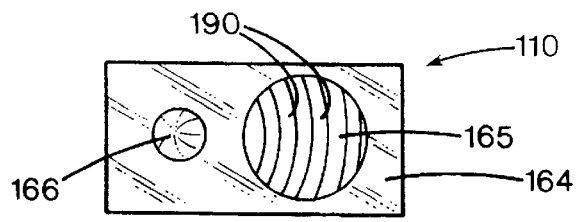
FIG. 5 is bottom plan view of the lens assembly of FIG. 4.
Figure 6:
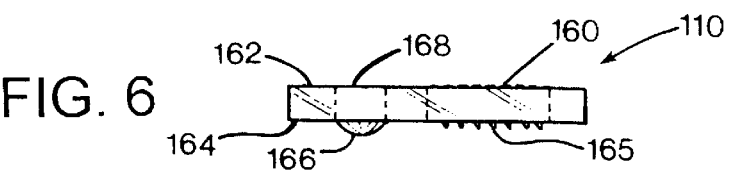
FIG. 6 is side elevational view of the lens assembly of FIG. 4.

FIGS. 4–6 illustrate the construction of the lens assembly 110 which may be made of an optical plastic material molded with lens elements formed therein. FIG. 4 shows a diffractive lens element 160 formed along a top surface 162 of the lens 110. The diffractive lens 160 is located directly beneath the LED output aperture 114 which extends through the casing 102. FIG. 5 illustrates a bottom view of the lens assembly 110 which has a bottom surface 164 facing down toward the printed media. Opposite the diffractive lens 160, the lower surface 164 has a Fresnel lens element 165. FIG.

6 best shows a photodetector lens element 166 projecting outwardly from the lower surface 164. Preferably, the lens 166 is a convex aspheric condenser lens. FIG. 4 illustrates an upper or output lens element 168 of the photodetector lens, which is directly opposite the input portion 166. While the output element 168 may be a flat extension of the upper surface 162 of the lens 110, in some embodiments, contouring of the upper surface 168 may be desired to improve the optical input to the photodetector lens 135. Preferably, the photodetector output element 168 is also a diffractive lens, which may be constructed as described above for the upper lens element 160 of the lens portion of assembly 110.

Figure 7:
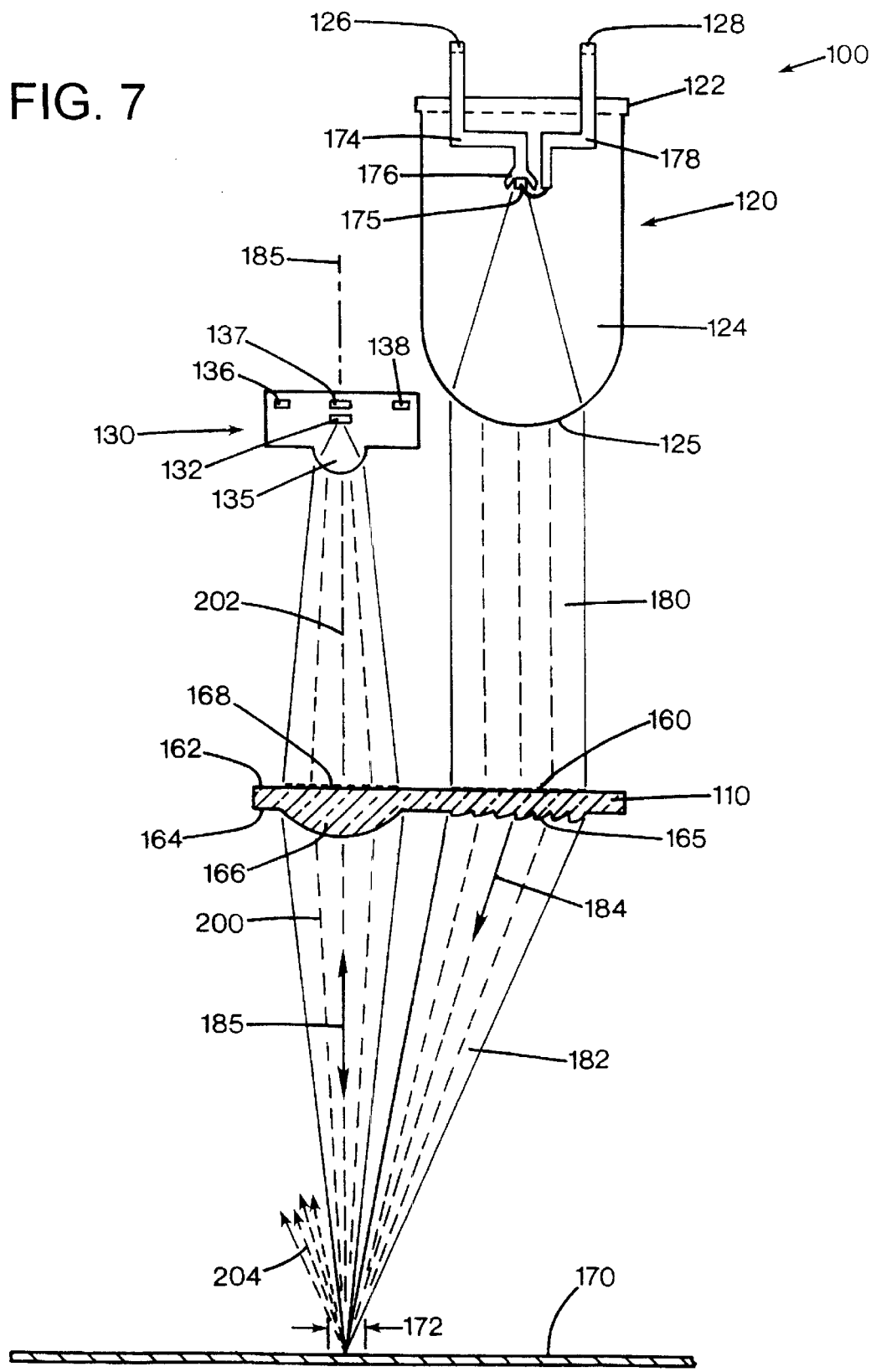
FIG. 7 is a schematic side elevational view illustrating the operation of the monochromatic optical sensor of FIG. 2.

FIG. 7 illustrates the operation of the blue LED 120 and photodetector 130 when illuminating a sheet of media 170 at a selected region 172. The internal components of the blue LED 120 are also illustrated in FIG. 7. The LED 120 includes a negative lead frame 174 which is electrically coupled to the conductor 126. The LED 120 also has a die 175 mounted within a reflector cup 176, which is supported by the negative lead frame 174. The die 175 is used to produce the blue wavelength light emitted by the LED when energized. A positive lead frame 178 is electrically coupled to conductor 128, and serves to carry current therethrough when the blue LED 120 is turned on. Preferably, the negative lead frame 174, the die 175, cup 176, and the positive lead frame 178 are all encapsulated in a transparent epoxy resin body which is conformed to define the output lens 125 as an integral dome lens that directs light from the die 175 into rays which form an illuminating beam 180.

The LED portion of the lens assembly 110, including elements 160 and 165, serves to deflect, focus and diffuse the LED output beam 180, and to direct a resulting modified LED beam 182 toward the illuminated region 172 on media 170. To accomplish this action, the Fresnel lens 165 along the lower surface 164, is an off-axis element having an optical axis 184 that is coincident with a central axis 185 of the photodetector 130, with this coincidence between axes 184 and 185 occurring in the illuminated region 172. Additionally, the Fresnel lens 165 also has a focal length which is approximately equal to half the distance between the Fresnel lens 165 and the printing plane of the media 170. The diffractive lens element 160 diffuses the LED output beam 180, while the Fresnel element 165 redirects the diffused beam to arrive at the modified beam 182. Specifically, the Fresnel lens 165 laterally deflects the incoming beam 180 through a prismatic action, which permits the LED lamp 120 to be closely mounted to the photodetector 130 to provide a compact package for the monochromatic optical sensor 100. Furthermore, the prismatic function of the Fresnel lens 165 also partially focuses the modified beam 182 to a small selected region 172, while the defractive lens 160 diffuses the light beam 180 in a controllable fashion to provide the desired illumination at region 172.

The defractive lens 160 preferably has a multitude of closely spaced ridges that are each spaced apart to provide an interference effect so that a passing beam is effectively steered to a selected direction. By steering different portions of the incoming beam 180 by different amounts, this steering has a focusing effect for the modified beam 182. By introducing a slightly angular offset in random or selected regions of the defractive lens 160, a focused image may be slightly jumbled or scrambled without loss of efficiency to diffuse the output beam 182. The cooperation of the detractive lens 160 and the Fresnel 165 is shown in detail in FIG. 8.

Figure 8:
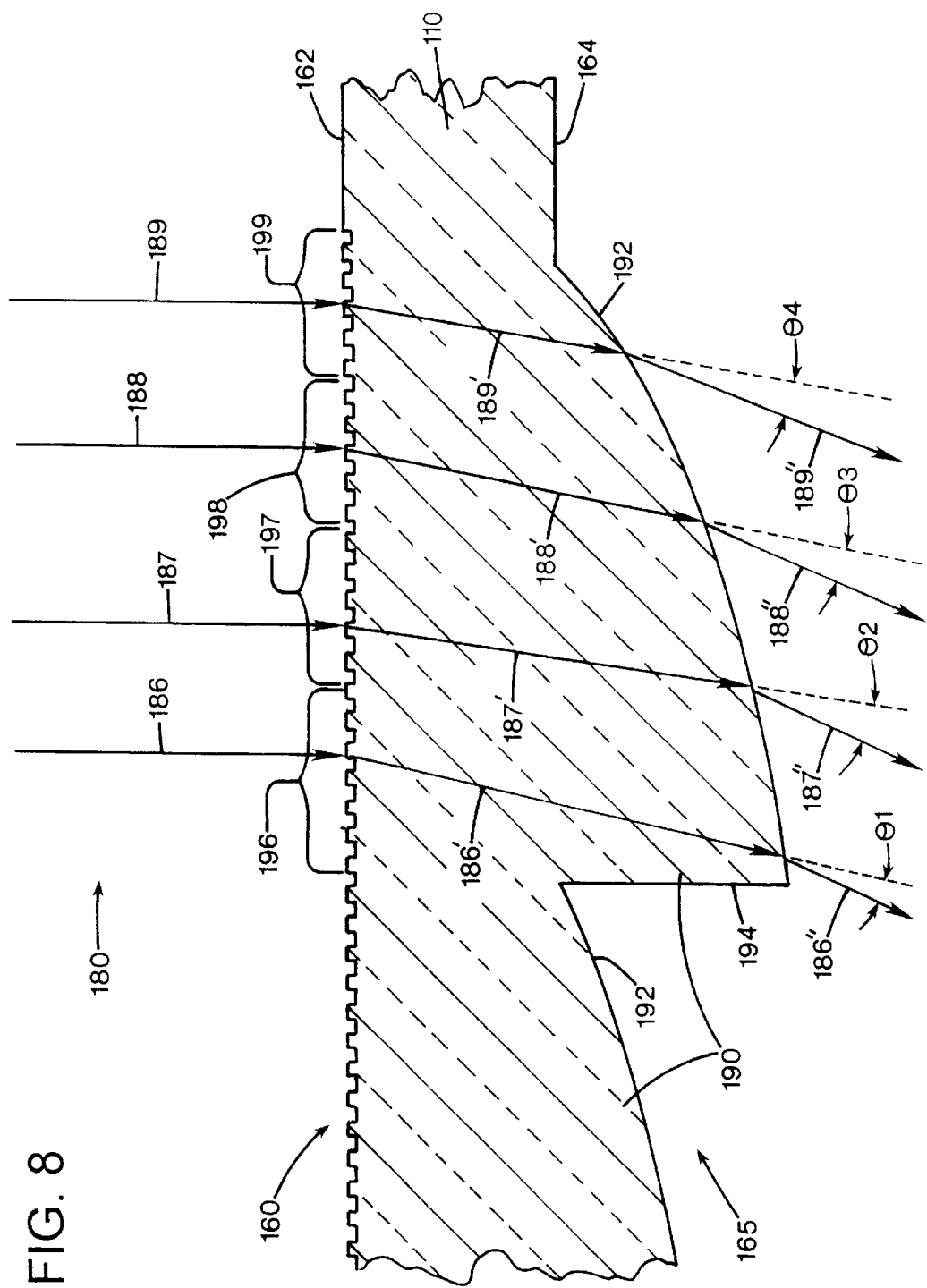
FIG. 8 is an enlarged, sectional view of a portion of the lens assembly of FIG. 4, illustrating the operation thereof.

FIG. 8 illustrates four incoming substantially parallel beams 186, 187, 188, and 189 of the LED output beam 180, which travel through the lens assembly 110 as beams 186', 187', 188', 189', then exit assembly 110 as beams 186", 187", 188", 189", respectively. The beam segments illustrated were selected to intercept one of plural crests 190 (see FIG. 5) upon exiting the Fresnel lens element 165. Each crest 190 has an downward arced surface 192 which terminates at a vertical wall 194, which is substantially parallel with the incoming beam segments 186–189.

The illustrated defractive lens 160 comprises a group of defractive cells 196, 197, 198 and 199, each shown redirecting one of the incoming beams 186–189 into beams 186'–189' which travel through the body of the lens 110. The curved arrangement of the cells 196–198 is shown in the top plan view of FIG. 4, with the curved aspect of these cells serving to begin directing the light beams toward the location of interest 172 on media 170 (FIG. 7), to the left in the view of FIG. 8. Besides this redirecting function, the diffractive lens element 160 also diffuses the beams to hide any irregularities in the lens element.

Preferably, each cell 196–199 comprises a group of finely ruled grooves that each have a slightly different pitch and orientation. By varying the pitch and orientation of the grooves, each cell 196–198 defracts the light rays 186–189 by a selected offset angle so the resulting rays 186"–189" exiting the lens are scrambled. This scrambling or diffusion of the rays is shown slightly exaggerated in FIG. 8, where the substantially parallel incoming beams 186–189 are no longer substantially mutually parallel as they travel through the lens as beams 186'–189'. While a simple offset using a controlled angle of about 0.5° in random directions may have an acceptable diffusing effect, preferably each cell 196–199 is carefully "programmed" that is, configured, to steer some of the rays 186'–189' more than others. This programmed diffusing effect tends to cancel out non-uniformities in the illumination pattern of the LED 120

When passing through the Fresnel lens element 165, the arced portion 192 of each crest 190 serves to deflect the beams 186'–189' at different angles, depending upon which portion of the arc 192 the beams intersect. For example, the exiting beams 186"–189" have angles of deflection shown as θ1, θ2, θ3, θ4, respectively, with θ1 being the least deflection, and then widening through θ2 and θ3, to the greatest deflection, θ4. Thus, the crests 190 of the Fresnel lens 165, shown in the bottom plan view of FIG. 5, also serve to further condense and redirect the incoming LED beam 180 to the left in the view of FIGS. 7 and 8.

Returning to FIG. 7, the modified light beam 182 is shown impacting the region of interest 172, and thereafter it is reflected off the media 170 as a reflected light beam 200. The reflected light beam 200 then enters the convex lens 166 of the photodetector portion of lens 110. The illustrated convex aspheric condenser lens 166 is selected to focus essentially all of the reflected light 200 from region 172 into the photodetector 130, which is done in the illustrated embodiment with a focal length of approximately 5 mm (millimeters). It is apparent that in other implementations having different packaging and placements for sensor 100, that other focal lengths may be selected to achieve these goals. Preferably, the photodetector upper output lens 168 is molded with a defractive surface, which advantageously corrects any chromatic aberrations of the primary convex input lens 166. Thus, the reflected light wave 200 is modified by the convex and defractive portions 166, 168 of the photodetector portion of lens assembly 110, to provide a modified input beam 202 to photodetector lens 135, which then focuses this input beam 202 for reception by the photocell 132.

Preferably, the blue LED 120 emits light 180 at a peak wavelength of 430–510 nm (nanometers). In the illustrated embodiment, the casing 102 with cover 104 attached together form a monochromatic optical sensor module, which has external dimensions comprising a height of about 23 mm, a thickness about 10 mm, and a width of about 14 mm. In the illustrated embodiment, the lower surface of lens 110 is spaced apart from the upper print surface of the media 170 by about 10 mm, so the selected area of interest 172 is about 1 mm in diameter. While the entire area of the selected region 172 is viewed by the photodetector 130, the area illuminated by the LED 120 is slightly larger, usually about two millimeters in diameter, assuring that the entire portion of the selected region 172 is illuminated by the blue light from LED 120.

Figure 9:
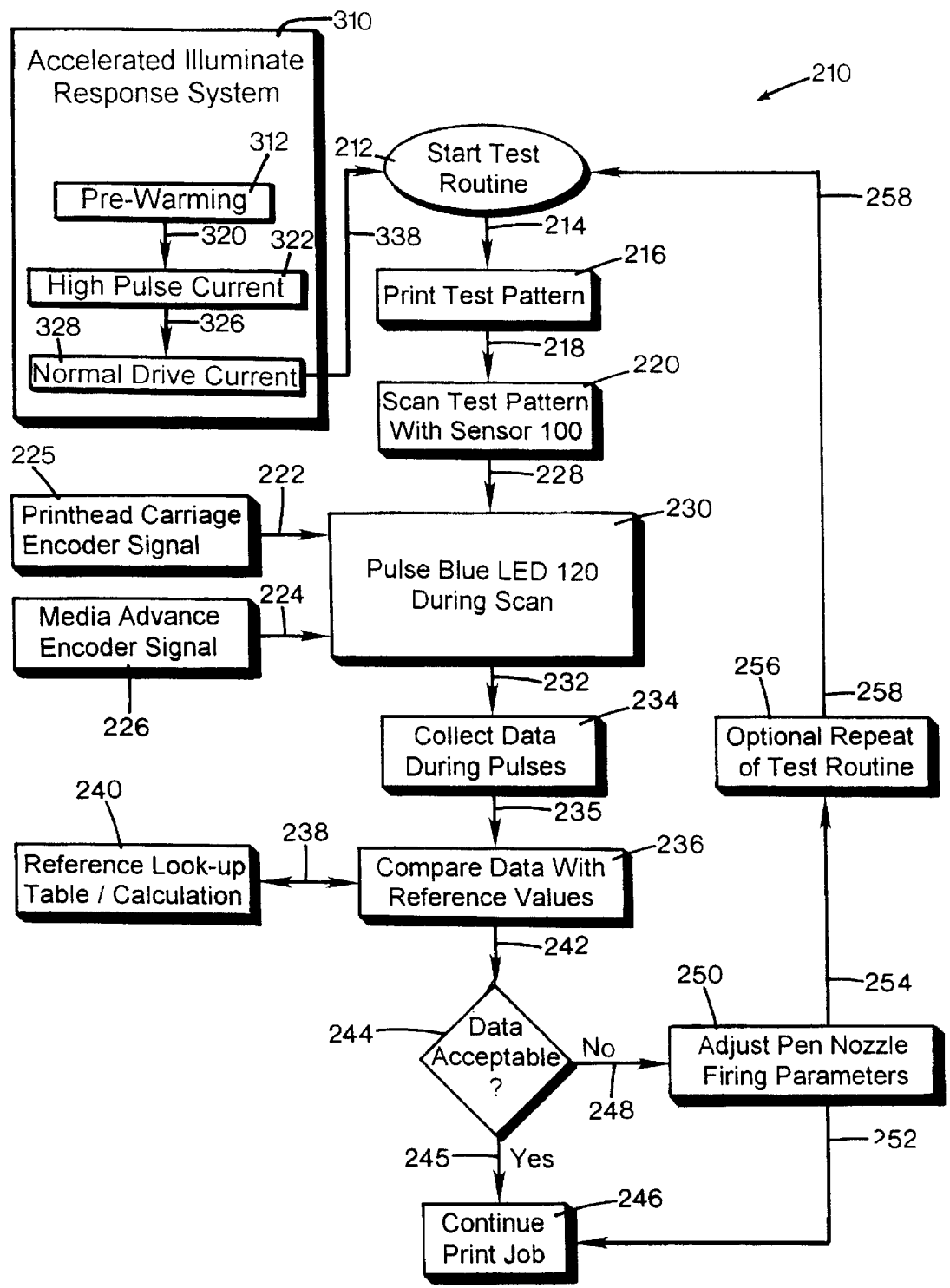
FIG. 9 is a flow chart of one manner of operating the monochromatic optical sensing system of FIG. 1.

In operation, FIG. 9 shows a flow chart illustrating one manner of operating a monochromatic optical sensing system 210 constructed in accordance with the present invention as including the monochromatic sensor 100 installed in printer 20. After an operator initiates a start test routine step 212, perhaps in response to prompting by the printer driver portion of controller 35, a start test signal 214 is sent to a print test pattern portion 216 of the system 210. The test pattern portion 216 then fires the nozzles to eject ink from one or more of the printheads 70–74 to print a test pattern on the media 170. For example, the printer controller 35 sends firing signals to the pens 50–56, causing the pens to print two patterns of parallel bars of each color, with one set of parallel bars being parallel with the scan access 38, and of the other group of parallel bars being perpendicular to the scan access 38. Upon completion of printing the test pattern, the test pattern portion 216 delivers a completion signal 218 to a scan test pattern with sensor portion 220 of system 210. After printing this test pattern, the carriage 40 again moves across the printzone 25, and the media sheet 170 is fed through the printzone by operation of the media advance motor 27 so the monochromatic sensor 100 passes over each pattern.

During this test pattern scan, the printer controller 35 uses inputs signals 222 and 224 from the printhead carriage position encoder 225 and the media advance encoder 226, respectively. To initiate the scan, the scan test pattern portion 220 sends a permission to pulse signal 228 to a pulse blue LED during scan portion 230 of the system 210. The encoder signals 222 and 224 are used to determine the timing of the LED pulses, as described below with respect to FIG. 10. It is apparent that other timing mechanisms may be used to pulse the LED 120, for instance, by pulsing on a temporal basis such as at a 1000 Hertz frequency during carriage or media movement, without using the carriage and/or media encoder signals 222 and 224. The pulses of portion 230 are used to generate a data acquisition signal 232 for a collect data during pulses portion 234 of system 210, which then transfers a scanned data signal 235 to compare data with reference values portion 236. In reviewing each pattern, the sensor 100 sends a variable voltage signal comprising signal 235 to the controller 35 to indicate the presence of ink printed within the field of view, such as region 172 in FIG. 7.

The printer controller 35 tracks locations of the test markings, and using portion 236 compares a desired location or parameter signal 238, stored in a reference look-up table or calculation portion 240, with the actual location or parameter monitored by the sensor 100, as represented by the data signal 235. Using the input sensor data of signal 235, the controller 35 calculates the actual position of each test pattern relative to the ideal desired position, and when required, the controller 35 enacts a compensating correction in the nozzle firing sequence for subsequent printing operations. The comparison portion 236 generates a resultant signal 242 which is delivered to a data acceptance portion 244. If the data is acceptable, then the acceptance portion 244 sends a Yes signal 245 to a continue print job portion 246 which allows printing to commence using the current nozzle firing parameters.

When a test mark on the media 172 is found at a location other than the desired location, or when a parameter is beyond desired limits, the acceptance portion 244 delivers a No signal 248 to an adjust pen nozzle firing parameters portion 250 of the printer controller 35, which then determines that a pen alignment or correction of the nozzle firing sequence is required. Following this correction by portion 250, a continue signal 252 may be sent to the continue print job portion 246. Optionally, following completion of the nozzle firing adjustment, portion 250 may send a repeat signal 254 to an optional repeat of test routine portion 256 of the monitoring system 210. Upon receiving signals 254, the repeat test portion 256 generates a new start signal 258 which is delivered to the start test routine portion 212 to reinitiate the monitoring system 210.

This scanning process involves activation of the blue LED 120 to emit the light beam 180, which is defracted or scrambled, i.e., diffused, by the defractive lens element 160, and then refracted and focused through the Fresnel lens 165. The diffraction occurs at different amounts so the majority of the modified rays 182 fall within the selected region of interest 172. Light impinging upon the selected region 172 has a specular reflection, illustrated as beam 204 in FIG. 7, that is reflected away from the optical axis of the aspheric element 166, due to the off-axis position of the LED lens elements 160, 165 of assembly 110. The highly modulated diffuse reflection from the selected region 172 is captured by the photodetector lens 166, which, in cooperation with the optional defractive portion 168, concentrates the reflective beam 200 into an input beam 202 supplied to the photodetector 130. As mentioned above, the photodetector 130 includes an amplifier portion 134, which amplifies the output of the photocell 132 and then sends this amplified output signal via conductors 136–138 to the controller 35 for analysis.

Figure 10:
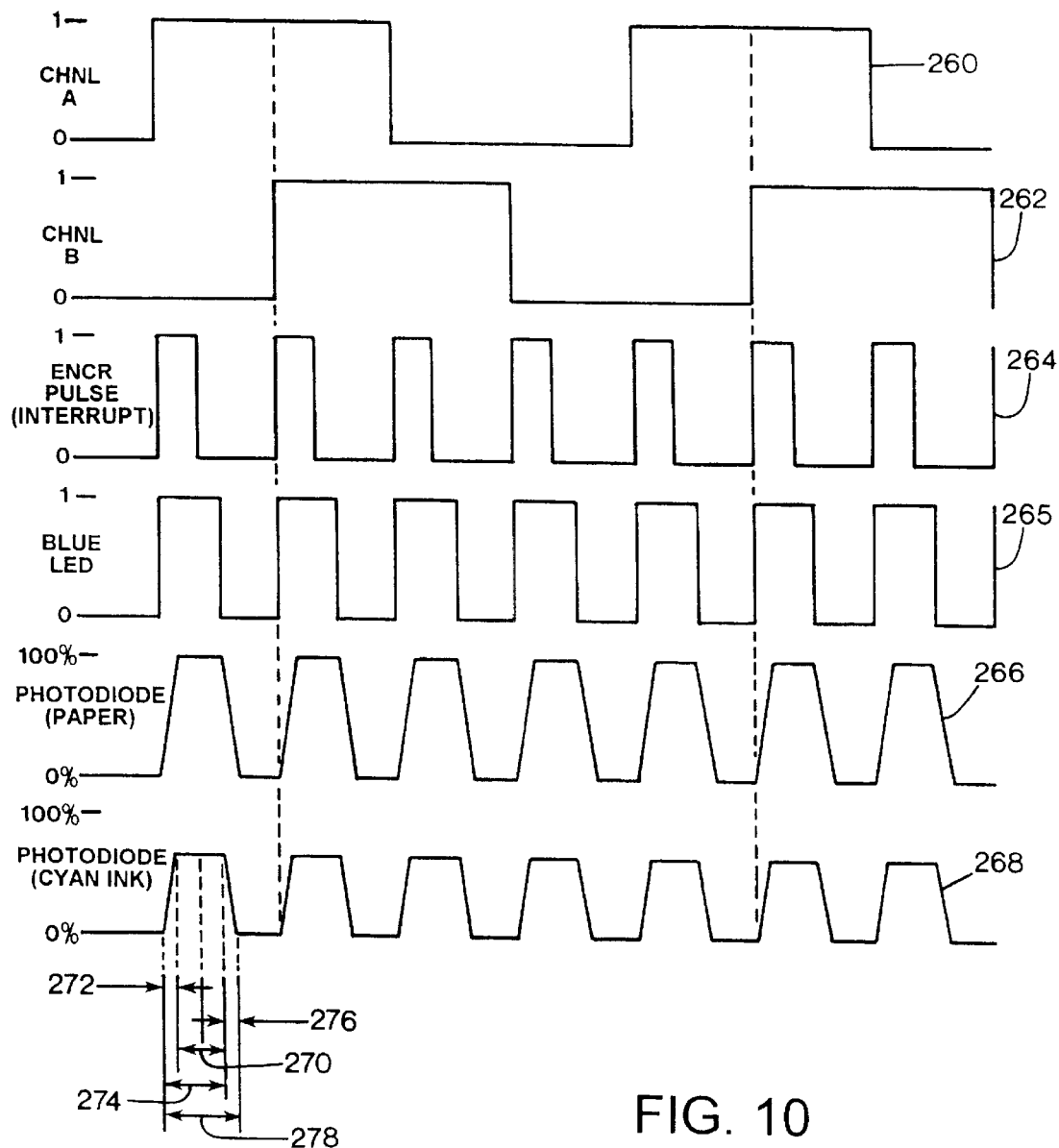
FIG. 10 is a signal timing diagram graphing the timing and relative amplitudes of several signals used in the monochromatic optical sensing system of FIG. 1.

As illustrated in FIG. 10, the controller 35 then accumulates each data point during a data window, which is preferably provided by energizing the blue LED 120 in a pulsed sequence. In FIG. 10, curves 260 and 262 show channel A ("CHNL A") and channel B ("CHNL B") as representing the transition of the positioning encoder on carriage 40, which may detect positional changes by monitoring the encoder strip 45 in a conventional manner. The channel A and B square waves 260, 262 then comprise the input signal 222 in the FIG. 9 flow chart. If the media advance is being scanned, then the channel A and B square waves 260, 262 represent the transition of the rotary position encoder for the media drive roller during media advancement through printzone 25 by operation of the media drive motor 27. Alternatively, this input may be supplied as a stepped output from motor 27, provided motor 27 is a stepper-type motor. Preferably, a rotary position encoder determines the angular rotation of the media drive component, with a rotary encoder reader providing the input shown as the channel A and B waves 260, 262, which together then comprise signal 224 in FIG. 9. When either the carriage or the media advance encoder changes state, these transitions, which are the vertical portions of curves 260 and 262, may be combined to generate an encoder pulse or interrupt signal, shown in FIG. 10 as curve 264. Each transition of curve 264 between zero and one may serve as an initiation signal for beginning a data acquisition sequence for the sensor 100.

The timing of the illumination of the blue LED 120 is shown in FIG. 10 as curve 265, with the numeral zero indicating an off-state of the LED, and numeral one indicating an on-state. For convenience, curves 260–265 have been drawn to illustrate illumination with a 50% duty cycle on the LED 120, that is, the blue LED 120 is on for half of the time and off for the remaining half. It is apparent that other duty cycles may be employed, such as from 10–50% depending upon the scanning of carriage 40 and the advance of media sheet 170 through the printzone 25. Advantageously, pulsing the blue LED 120 with the illustrated 50% duty cycle obtains nearly twice the luminate intensity obtained using the HP '002 and '014 LEDs which were left on full time, as described in the Background section above.

In FIG. 10, curve 266 indicates the output of the photodetector 130 when the illuminated region 172 has no ink printed, so curve 266 indicates sensor 100 being focused on plain white paper. Thus, the maximum amplitude of signal 266 is shown as 100%, which provides a reflective luminosity reference for bare media to the controller 35 for the particular type of media 170 being used in the test process. For instance, brown paper would have less luminosity than white paper leading to a lower magnitude of light reaching the photodetector 130, yet, curve 266 still would be considered as a 100% no-ink reference by controller 35. Curve 268 illustrates the reflectance of cyan ink, when a cyan droplet appears in the illuminated region 172. Cyan ink has a reflectance of approximately 60% that of plain white paper, as illustrated by the lower magnitude of curve 268 when compared to the no-ink, bare media curve 266.

The monitoring cycle during which controller 35 collects data is illustrated near the bottom of FIG. 10. Here, a data acquisition window 270 during which controller 35 monitors input from sensor 100 begins after a rise time 272. This rise time 272 begins at the initiation of a pulse of the LED 120, and ends after a known rise time of the photodetector 130, which may be obtained from the manufacturer specifications for the particular photodetector used. The LED 120 remains illuminated for a pulse 274 (at a value of "1") for the duration of the desired pulse width, as also illustrated by the curve 265, after which the LED is turned off (value of "0"). The time between the end of the rise time 272 and when the blue LED 120 is turned off, defines the data acquisition window 270. At the end of window 270, the monitoring cycle is not yet complete because after turning off the LED 120, the photodetector 130 needs a stabilizing fall time 276. Thus, a total cycle time 278 of the sensor 100 starts at the beginning of the pulse to the LED 120, and then concludes at the end of the photodetector fall time 276, that is, the total cycle time equals the duration of the data acquisition window 270 plus the rise and fall times 272, 276 of the photodetector 130. Upon completion of this monitoring cycle 278, the sensor 100 remains dormant until the next encoder state change, as indicated by curve 264. During the data acquisition window 270, an A/D converter within the controller 35 is enabled and allowed to acquire the output signal of photodetector 130, as supplied via conductors 136–138.

The duty cycle of the blue LED 120, illustrated by curve 265 in FIG. 10, is dependent upon the desired forward current, that is the illumination level, and the speed at which the carriage 40 is scanned, or the speed at which the media 170 is advanced while the carriage is scanning across printzone 25. The speed of the media advance and the carriage dictates the allowable pulse width duration given the desired forward current. The relationship between the pulse width and the diode current is dependent upon thermal characteristics of the particular diode used, which are specified by the LED manufacturer. To maintain the spacial sampling and thermal control constraints of the blue LED 120, all scanning is preferably done at a constant specified velocity of the carriage 40 or the media drive motor 27, although it is apparent that other monitoring implementations may use variable or accelerating velocities while scanning.

Other print parameters may also be monitored by the monochromatic optical sensor 100 and adjusted by the controller 35 using method 210 illustrated in FIG. 9. For example, using the same sampling methodology, the monochromatic sensor 100 may also determine the color balance and be used to optimize the turn-on energy for each of the printheads 70–76. For example, to adjust color balance, regions of each primary ink may be printed, or a composite of overlapping droplets may be printed. A gray printed region, using all three color inks may also be suitable for such a color balance test pattern. By using the expected reflectance of the LED wavelength from the printed color as stored look-up table 240 of FIG. 9, and then comparing this expected reflectance with a measured reflectance in the comparison portion 236, the intensity of printing of a particular color may be determined and then adjusted by controller 35 to a desired level in step 250 of FIG. 9.

To measure the turn-on energy of the nozzles of printheads 70–76, swaths of printing test patterns may be made in step 216 of FIG. 10 using different amounts of energy applied to the firing resistors of each printhead 70–76. As the firing energy drops below a particular threshold, some of the printhead nozzles will cease to function, leaving no image on the media. By monitoring the energies at which drops were printed, and the locations at which the drops no longer appear on media 170, then in step 250, the controller 35 adjusts the turn-on energy for each nozzle by a limited amount above this threshold, so that only the minimal amount of energy required to print is applied to each resistor. By not overdriving the resistors with excessive power, resistor life is maximized without suffering any sacrifice in print quality.

Implementation of the monochromatic optical sensor 100 has recently become feasible for the more competitively priced home inkjet printer market. As mentioned in the Background section above, historically blue LEDs have been weak illuminators, and while brighter blue LEDs were available, they were prohibitively expensive for use in inkjet printers designed for home use. Recently, this pricing situation changed, and the bright blue LEDs have become available from several manufacturers. With this increased availability, competition in the market place has driven the price of these brighter blue LEDs down so quickly that at one point, a price decrease of 50% occurred over a two-month period of time. Thus, use of these brighter blue LEDs is now within the realm of consideration for the low volume, higher end products using the earlier HP '002 and '014 sensors. The advent of the monochromatic optical sensor 100, which eliminates the green LED of the HP '002 sensor, makes the use of optical sensors in home inkjet printers now feasible. Additionally, by employing the pulsed operation of the blue LED, as described above with respect to FIG. 10, this unique manner of driving the single blue LED 120 has further increased the light output of the sensor 100 by two to three times that possible using the earlier HP '002 and '014 sensors, where the LEDs always remained on during scanning.

Figure 11:
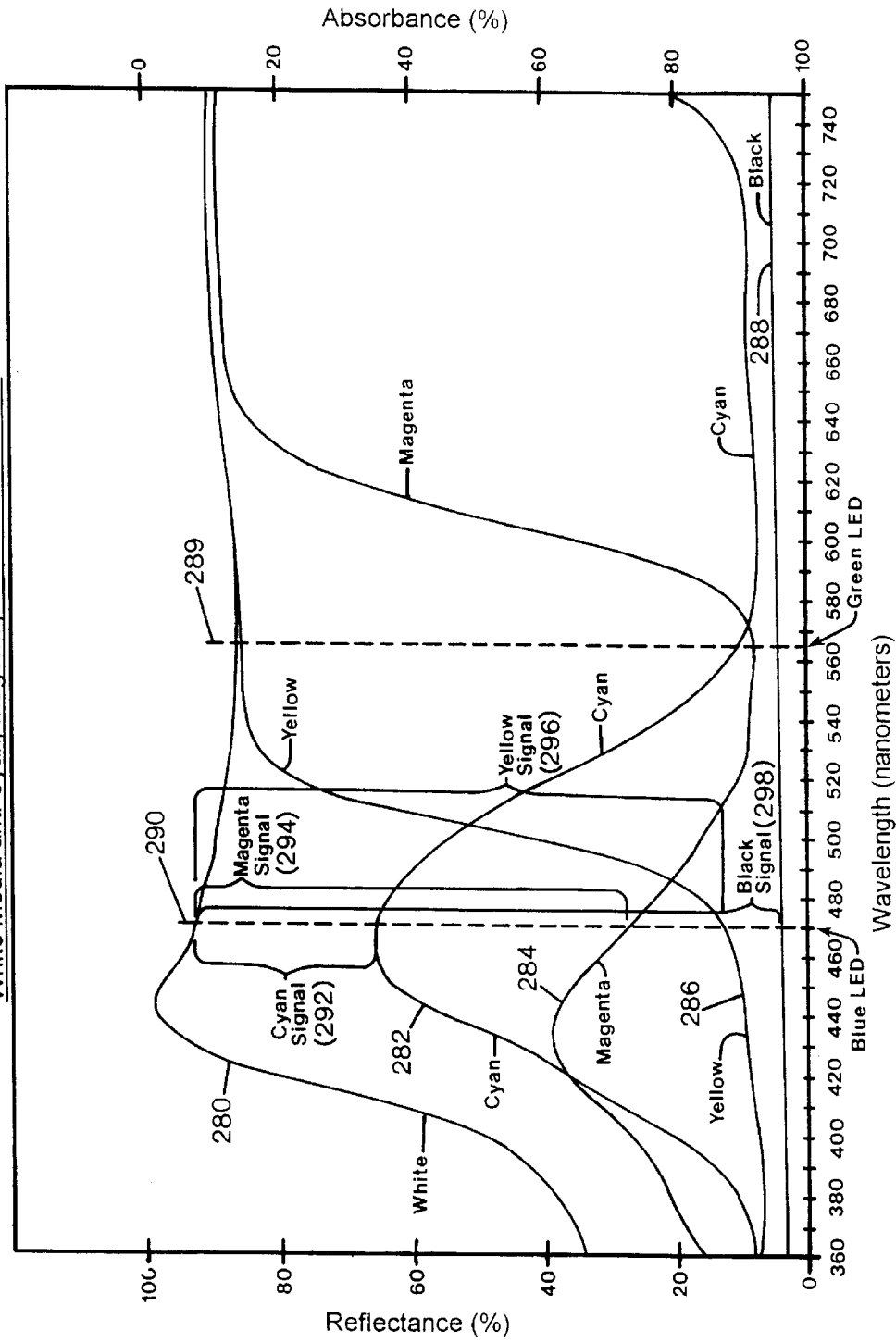
FIG. 11 is a graph showing the relative spectral reflectances and spectral absorbances versus illumination wavelength for white media, and cyan, yellow, magenta, and black inks, as well as the relative signal magnitudes delivered by the monochromatic optical sensing system of FIG. 1 when monitoring images printed on the media.

FIG. 11 is a graph of the spectral reflectance and absorbance by wavelength of the various primary colors of ink, black, cyan, magenta and yellow as well as that of white paper media 170. In FIG. 11, these reflectance and absorbance traces are shown as a white media curve 280, a cyan curve 282, a magenta curve 284, a yellow curve 286, and a black curve 288. In the past, the green LEDs emitted light at a wavelength of around 565 nm (nanometers), as illustrated at line 289 in FIG. 11. The blue LED 120 emits light at a peak wavelength of approximately 470 nm, as illustrated by a vertical line 290 in FIG. 11. By measuring at the illustrated 470 nm location, a separation between each of the ink traces 282–288 and media trace 280 is available. Indeed, monitoring anywhere between the onset of visual perception at a 430 nm peak wavelength and the transition point of the yellow ink reflectance at a 510 nm peak wavelength provides suitable curve separations for ease of monitoring using the monochromatic sensor 100.

A few definitions may be helpful at this point, before discussing FIG. 11 in depth. "Radiance" is the measure of the power emitted by a light source of finite size expressed in W/sr-cm$^2$ (watts per steradian—centimeters squared). "Transmission" is a measure of the power that passes through a lens in terms of the ratio of the radiance of the lens image to the radiance of the original object, expressed in percent. "Transmittance" is a spectrally weighted transmission, here, the ratio of the transmitted spectral reflectance going through the lens, e.g. beam 182, to the incident spectral reflectance, e.g. beam 180 (FIG. 7). "Reflected light" or "specular reflection" is that portion of the incident light that reflects off the media at an angle equal to the angle at which the light struck the media, the angle of incidence. "Reflectance" is the ratio of the specular reflection to the incident light, expressed in percent. "Absorbance" is the converse of reflectance, that is, the amount of light which is not reflected but instead absorbed by the object, expressed in percent as a ratio of the difference of the incident light minus the specular reflection, with respect to the incident light. "Diffuse reflection" is that portion of the incident light that is scattered off the surface of the media 170 at a more or less equal intensity with respect to the viewing angle, as opposed to the specular reflectance which has the greatest intensity only at the angle of reflectance. "Refraction" is the deflection of a propagating wave accomplished by modulating the speed of portions of the wave by passing them through different materials.

One important realization in developing the sensing system 210, using the monochromatic optical sensor 100, was that with a subtractive primary color system, cyan ink will never achieve the spectral reflectance of the paper upon which it is printed. Printing with the colors of cyan, yellow and magenta is considered to be a "subtractive" primary color system, as opposed to the combination of red, green, and blue which is considered to be an "additive" system, such as used to produce color images on television and computer screens. As seen in FIG. 11, the yellow curve 286 approaches the reflectance of the media curve 280 just to the right of line 289, whereas the magenta curve 284 approaches the media curve 280 around the 650 nm wavelength intersection point. The cyan curve 282 peaks at around 460 nm at a level of about 60% reflectance, which is far less than the reflectance of the media curve 280 at that point. Cyan ink will not reach the spectral reflectance of the media 170 for two reasons.

First, most paper is coated with ultraviolet fluorescing compounds which make the paper appear whiter by absorbing ultraviolet (uV) ambient light and then fluorescing this light back off the paper at slightly longer blue wavelengths. Since paper does not fluoresce from exposure to the blue spectrum of ambient or room light, the apparent reflectance of the ink, even if cyan ink had perfect transmittance, would never reach 100%. This difference, due to the fluorescing nature of the paper media 170, comprises a detection signal used by the controller 35, as discussed further below.

Second, the peak transmittance of cyan dyes is typically lower than ink with yellow or magenta dyes, and this transmittance never exceeds 80%, as seen from the curve 282 in FIG. 11. The currently available dye compounds which readily absorb longer wave length light, down to the green range of this desired spectrum, tend to continue to absorb light even within this blue transmissive range. Thus, adjusting the dye compounds in an effort to increase blue transmittance results in a corresponding decrease in the long wavelength absorption, for instance, as indicated at the 560–750 nm portion of the cyan curve 282 in the FIG. 11 graph. Therefore, inherent to the dye chemistry, a difference between the bare media reflectance and the cyan ink reflectance always exists. This difference in reflectance is what is exploited by the monochromatic optical sensor 100.

In the past, use of the green LED emitting light at a 565 nm wavelength allowed detection of cyan and magenta at their minimal reflectance (left scale of FIG. 11, which is also their maximum absorbance, as indicated by the scale to the right of FIG. 11.) Unfortunately, detection of yellow at the 565 nm wavelength proved to be a problem because the yellow reflectance approximated that of the white paper at this green LED wavelength. This problem was addressed by printing magenta ink over a previously printed yellow test band, with differing results depending upon the type of media being used, as discussed in the Background section above.

This yellow ink detection problem is avoided by monitoring the media and ink droplets when illuminated at the 470 nm peak wavelength of the blue LED 120, because the signals used by the controller 35 are the absorbance of these inks relative to the absorbance of the media 170. Indeed, yellow ink may be easily detected between the 430 nm and the 510 nm peak wavelengths. As seen in FIG. 11, at the 470 nm wavelength of the blue LED 120, the ink curves 282–288 are each separated in magnitude from one another. While the illustrated blue LED emits a 470 nm wavelength, this value is discussed by way of illustration only, and it is apparent that other wavelengths of monochromatic illumination may also be used to exploit any other points on the graph where there is adequate separation of the ink curves 282–288 to allow detection and differentiation between the colors, including ultraviolet or infrared wavelengths. In the illustrated embodiment, the absorbance of the cyan ink produces a cyan signal 292, which is the difference between the absorbance of the cyan ink and the media when illuminated at a 470 nm wavelength. Similarly, a magenta signal 292, a yellow signal 296, and a black signal 298 are each produced as the difference between the absorbance of each of these inks and the absorbance of media 170 when illuminated at 470 nanometers by the blue LED 120. Thus, the cyan signal 292 is a difference of approximately 30%, the magenta signal 294 is approximately 70%, the yellow signal 296 is approximately 80%, and the black ink signal is approximately 90%.

As another advantage, there is a mutual relationship between the intensity of the illumination at location 172

(FIG. 7) and the source of noise in the resulting signals sent to the controller 35. With all other factors being equal, the noise produced by the photodetector 130 is a function only of the pulsing frequency of the blue LED, which then increases by the square root of the signal frequency. Increased intensity, however, does not increase the noise. Thus, pulsing of the LED 120 is an efficient way to increase the intensity of beam 180 and the signal-to-noise ratio. While the noise will increase with increases in the pulsing frequency, the level of the signal increases at an even greater rate. At moderate pulsing frequencies, such as those around one to four Kilo-Hertz, the benefits of the larger signal greatly outweigh the disadvantages of the increased noise. Thus, this pulsed driving scheme for illuminating the media with LED 120, and the data sampling routine illustrated above with respect to FIGS. 9 and 10, efficiently and economically allows monitoring of drop placement on the media in an automatic fashion by the printer 20 without user intervention.

Accelerated Illuminate Response System

In operating the monochromatic optical sensor 100 as described above, it was found that the warm-up time required for the sensor 100 significantly slowed the overall test routine. Additionally, use of a test pattern 216 was found to consume additional print time, while also consuming a sheet of print media, which can be relatively expensive, for instance when using photographic quality media. Thus, to increase the throughput (pages per minute) rating of printer 20 without waiting for a test page to be printed and monitored, it would be desirable to stealthily or secretly monitor ink droplets placed on the media during an operator's normal print job. in this manner, an operator would not experience any delay by the sensing routine, nor consume any additional print media. By making the sensor function relatively transparent to the operator, the resulting printer 20 would be both easy to use and fast. With this goal in mind, the challenge then became how to operate sensor 100 more rapidly, and this first required an understanding of exactly what mechanism or characteristic was slowing the response of sensor 100.

Figure 13:
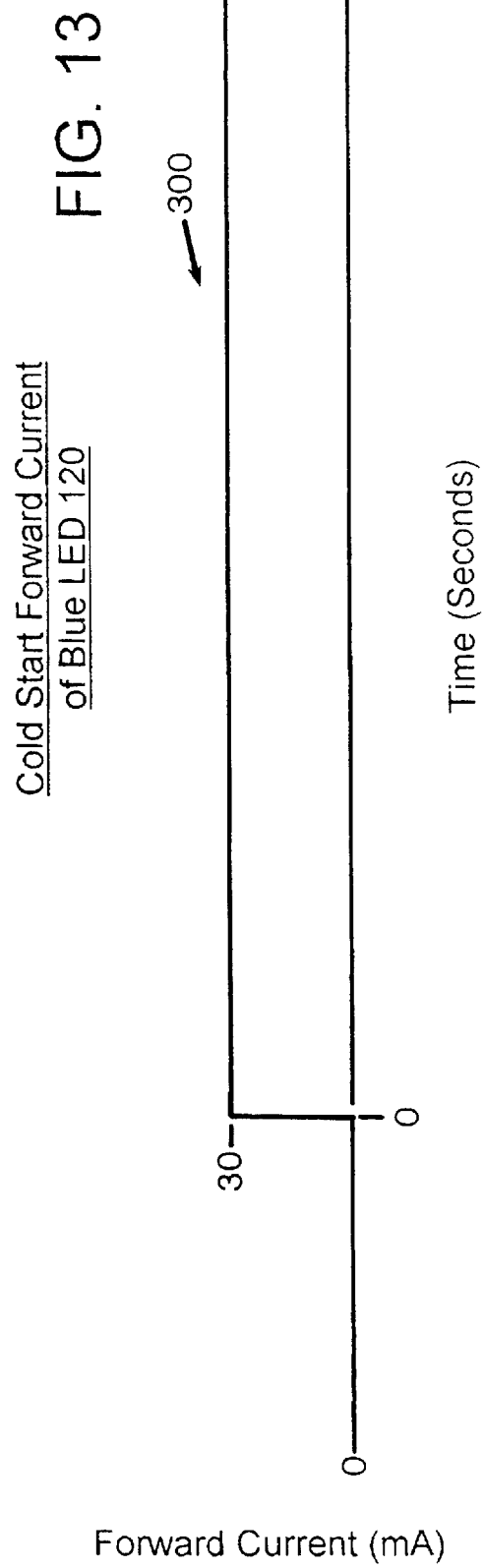
FIG. 13 is a graph of a cold start forward current of the sensor of FIG. 2.
Figure 14:
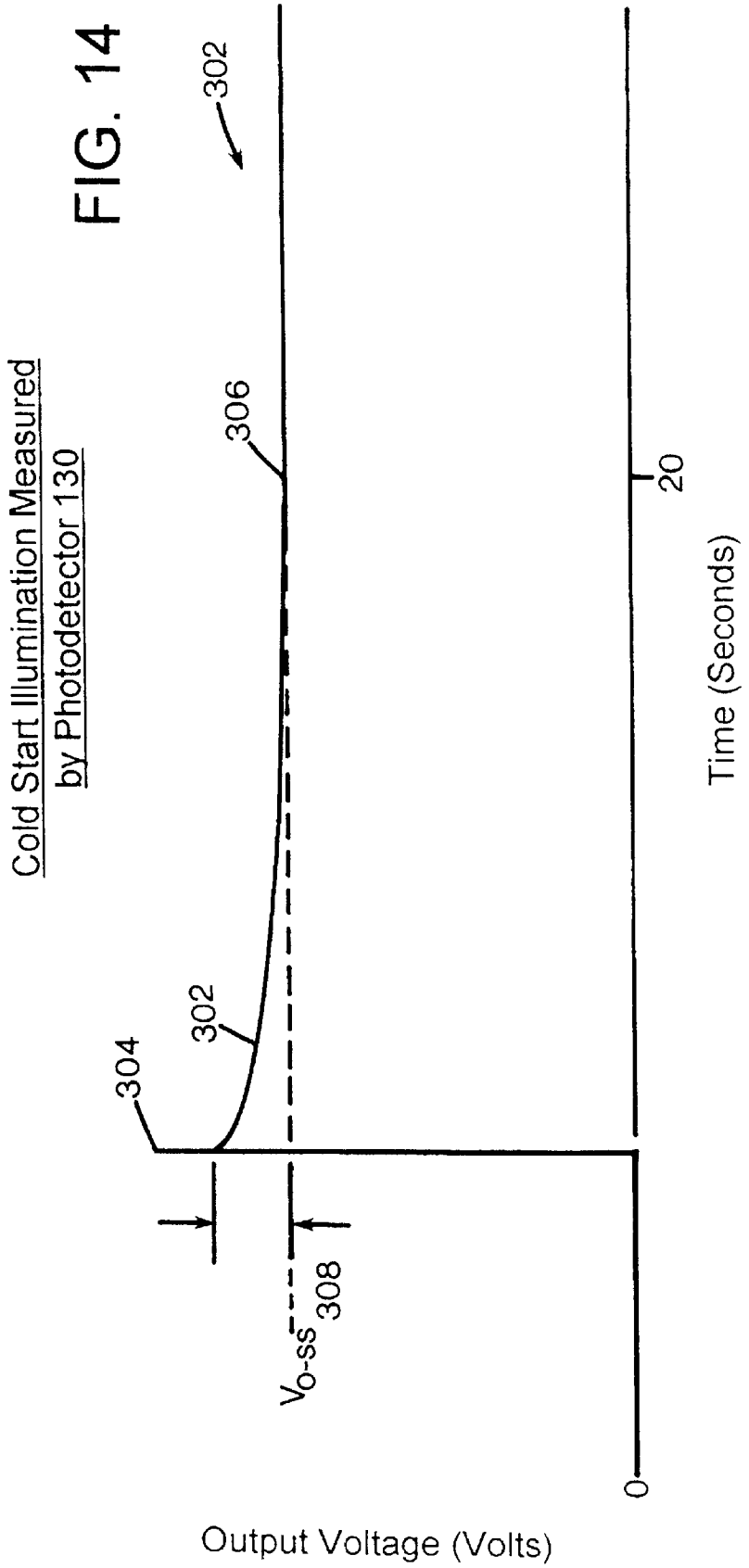
FIG. 14 is a graph of a cold start illumination output of the sensor of FIG. 2.

As described above, the blue LED 120 illuminates the media 170 in the illuminated region 172, and this illumination is modulated by the presence or absence of ink, with the intensity of the reflected beam 200 being varied, as seen by the photodetector 130. Variation in the intensity of this illumination 200 across the bare unprinted media manifests itself as noise in the sensor signal supplied via conductors 136–138 to the controller 35. For accurate measurements, this bare media noise must be kept to a minimum. Unfortunately, when an LED is energized, the illumination first goes through a transient response with an initially large amplitude, and then subsides into a lower steady-state value. At room temperature, the steady-state value is reached after approximately 20 seconds, as illustrated in FIGS. 13 and 14. FIG. 13 shows a graph 300 of the forward current $I_f$ applied to the blue LED 120 during a "cold start" turn-on of the LED 120. At time t=0, we see the forward current curve 300 has raised to a maximum level of 30 milli-Amps (mA), which is the maximum DC (direct current) level of the forward current $I_f$. FIG. 14 shows curve 302 which is the illumination level as measured by photodetector 130, as an output voltage $V_O$. At time t=0, this illumination curve 302 peaks at point 304, which is a value of approximately four times the normal DC steady-state value. After this initial peak 304, the DC current events exhibits a first order decay. The magnitude of this decay has been found to vary with the ambient temperature, but the decay is normally on the order of 20% of the steady-state value of the output voltage $V_{O-SS}$ at room temperature. The duration of this decay to a value of approximately 2% of the steady state value ($0.02V_{O-SS}$) takes about 20 seconds ($t_{SS}$=20 sec.), as shown in FIG. 14 at point 306. Note the initial voltage droops, with the magnitude of this droop being illustrated by a difference 308 of approximately 0.2 times the steady state output voltage $V_{O-SS}$.

In studying this start-up voltage spike or illumination transient 304, it was found that this transient is caused by a thermal effect. In FIG. 7, the resulting illumination 180 emitted from LED 120 is actually a function of two factors:

(1) the forward current $I_f$ through the LED, and (2) the temperature of the diode junction of the LED.

Specifically, the illumination 180 increases with increased forward current $I_f$ (directly proportional), and decreases with increased temperature at the LED's diode junction (indirectly proportional).

At start-up when the LED 120 is turned on, the diode junction and the LED package 124 are at the same temperature as the ambient air surrounding LED 120. As the forward current $I_f$ starts to flow, the LED diode junction heats up, and the light output begins to decrease. The heat generated by this junction begins to migrate into the package 124. Since the package 124 is so much more massive than the blue LED die 175, the heat initially is consumed by heating the package 124. Heating the package 124 serves to farther drive up the temperature of the die 175, causing the illumination 180 to decrease firther. Eventually, the package 124 is warmed to a stable level at thermal equilibrium, and any additional heat generated by the photodetector is then transferred to the surrounding ambient air. When this thermal equilibrium is finally established, the temperature difference between the diode junction and the ambient air is great enough to continually migrate the waste heat from the diode junction, through the package 124, and into the ambient air. The time required to heat the LED diode junction and the package 124 to this equilibrium temperature is referred to as "warm-up time." Since the illumination is constantly changing during this warm-up time, the whole process may be referred to as an illumination transient. Thus, the steady state illumination for a given LED 120 is a function of the forward current $I_f$ and the ambient temperature surrounding the blue LED package 124.

Unfortunately, waiting for this illumination transient to subside negates any attempts at stealthily turning on the monochromatic sensor 100 to measure print artifacts in an operator's normal print job. Indeed, this warm-up time becomes as great as the time actually required to print nearly two entire standard pages. Such a long delay is not to acceptable to consumers, as one of the competitors of the current assignee recently discovered when they experienced a dramatic increase in warranty returns as new customers discovered that the time devoted to producing their elaborate calibration page was seven minutes. With a much shorter goal in mind for a printing a test page, on the order of two or three minutes, devoting 20 seconds of that allotted time to wait for the illumination transient to subside is clearly not an acceptable alternative in a consumer marketplace. Leaving the LED 100 continually turned on (which was the practice using the HP '014 and '002 sensors, as described in the Background section above) is also an undesirable solution, because the energy efficient use of the blue LED duty cycle as described above with respect to FIG. 10 is no longer realized. Moreover, leaving the blue LED 120 on continually may also be a source of possible annoyance to an operator, with a bright blue light continually flashing back and forth every time the carriage 40 traverses across the printzone 25. Thus, another approach for driving the LED was needed to decrease this warm-up time lag caused by the illumination transient.

Figure 15:
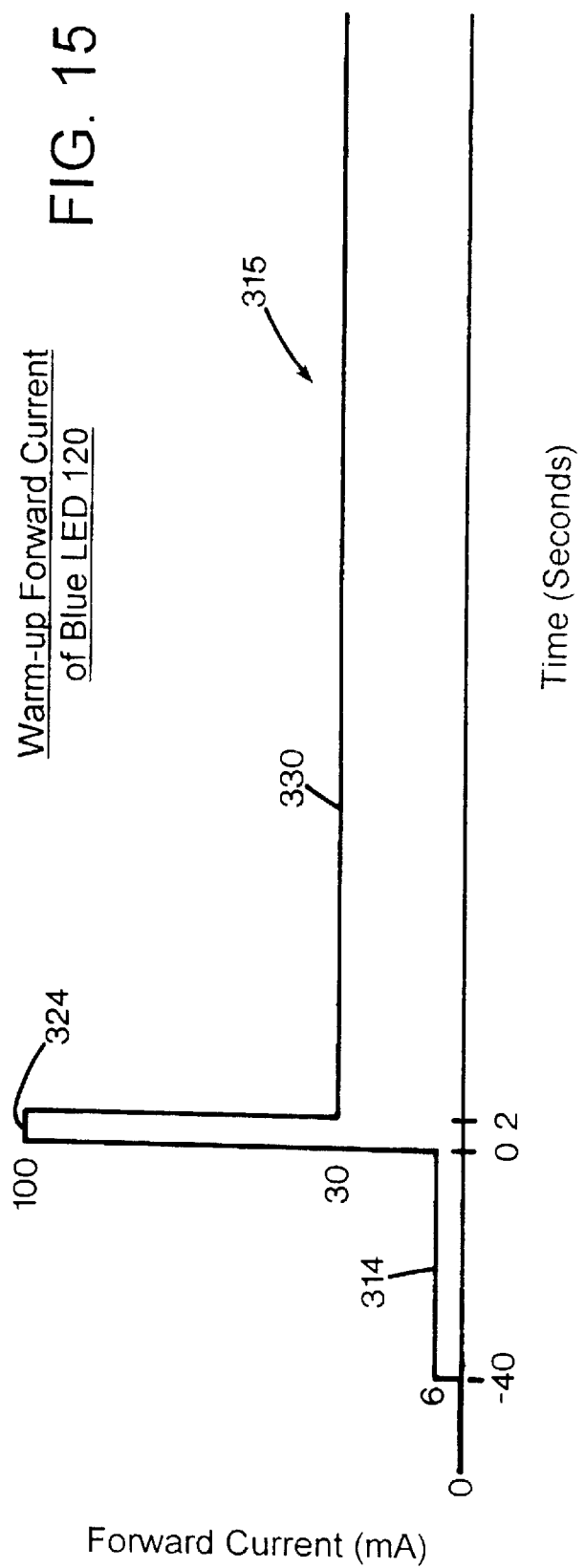
FIG. 15 is a graph of a warm-up forward current of the sensor of FIG. 2.
Figure 16:
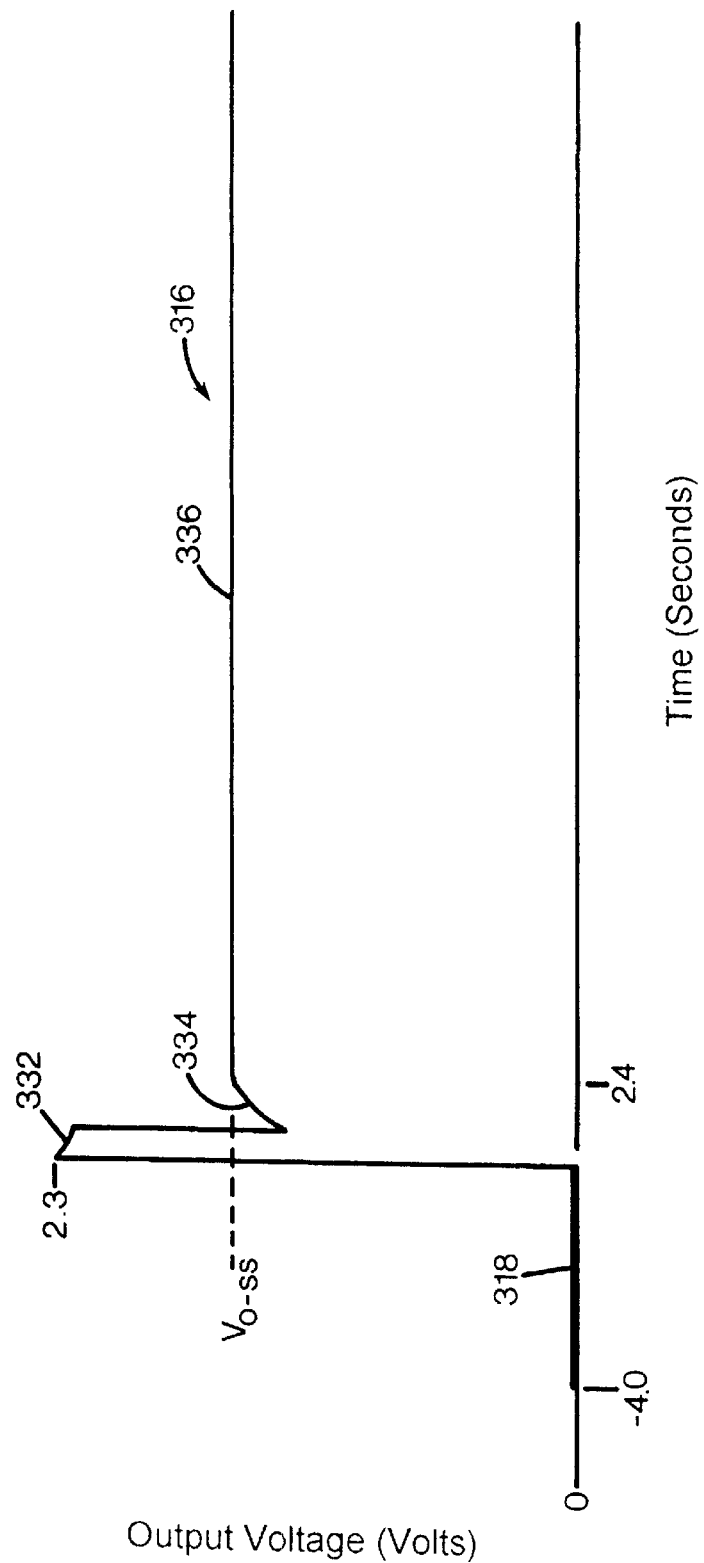
FIG. 16 is a graph of a warm-up illumination of the sensor of FIG. 2.

FIGS. 9 and 15–16 illustrate an accelerated illuminate response system 310 for driving a light emitting diode in accordance with the present invention, such as the blue LED 120 of the monochromatic optical sensor 100, that does not suffer an extended delay at start-up while waiting for the illumination transient to subside. In the illustrated embodiment, this accelerated illuminate response system 310 comprises three steps, as shown in FIG. 9. First there is a pre-warming step 312, where the blue LED is first driven at a very low level forward current, such as on the order of 5–30% of the normal drive current level, or more preferably within 15–25% of the steady-state maximum current. A preferred value of 20% of the maximum current is shown as 6 mA in FIG. 15. This pre-warming step is conducted for at least as long as the illumination transient period, or more preferably for at least twice as long as the illumination transient period, with a preferred duration of approximately twice as long as the illumination transient period being illustrated here as a duration of 40 seconds, shown by a pre-warming section 314 of a warm-up forward current graph 315 in FIG. 15. Using other components may lead to other magnitudes of pre-warming current and other suitable durations, and a preferred methodology for making these selections is described further below with respect to FIGS. 17 and 18. As shown in FIG. 16, a warm-up illumination graph 316 of the output voltage $V_O$ representing the illumination as measured by the photodetector 130, shows a very low-level illumination 318 that is almost unnoticeable during this pre-warming step 312.

The relatively long duration of the pre-warming step 312, 314 allows the LED 120 to reach a thermal equilibrium to pre-warm the die 175 and the LED package 124 in an unobtrusive manner. When scanning is performed starting at time t=0 in graphs 315 and 316 of FIGS. 15–16, an end of pre-warming signal 320 is sent to a second step of the accelerated illuminate response system 310 which is a high pulse current step 322, as shown in FIG. 9. The forward current $I_f$ is stepped to a high current pulse at a current level of three to four times the normal drive current, or at the maximum rated level for pulsed operation of the particular LED, here shown as portion 324 of curve 315 in FIG. 15. In the example, given the illustrated LED 120, this maximum rated pulsed level is 100 mA. The duration of the 100 mA pulsed step 322 is based upon the manufacturer's specifications for the LED. In this example, the duration of the pulsed step 322 is two seconds for the blue LED 120.

Following completion of the high pulse current step 322, a signal 326 is sent to a third step of the accelerated illuminate response system 310, here, a drop to normal current drive step 328. As shown in graph 315 of FIG. 15, the forward current $I_f$ is dropped down to the maximum DC level along portion 330 of the graph, here, 30 mA. More interesting, is the response of the warm-up illumination graph 316 in FIG. 16, during the high pulse current step 322 and at the drop toward normal drive current step 328. Here, we see graph 316 upon initiation of the high current pulse step 322, 324, exhibits a spike of three times the steady-state illumination at section 332 of graph 316. The illuminate output then undergoes a second order decrease followed by a secondary second order increase as the drop to normal drive current step 328 occurs as shown along portion 334 of graph 316. This increase along the graph portion 334 eventually concludes at the steady-state level of illumination as shown along portion 336 of graph 316. The output voltage $V_O$ of the photodetector 130 increases to a selected level within for instance, about 5% of the steady state illumination level, or more preferably, within about 1–3% of the steady state illumination level, or even more preferably, as shown within about 2% of the steady state illumination level in approximately 2.4 seconds after initiation of the 100 mA step at time t=0. That is, instead of a 20 second delay, the illumination with warm-up is within 2% of the steady state value after 2.4 seconds, rather than 20 seconds as shown in FIG. 14, a decrease of approximately 88% using the pre-warming and pulsing steps 322 and 328. At the conclusion of the accelerated illuminate response routine 310, an initiate test routine signal 338 is sent to the start test routine step 212 of the flow chart 210 in FIG. 9, and the remainder of the process then proceeds as described above.

With respect to FIG. 16, the area under the 100 mA, $I_f$—t curve may be thought of as the energy being utilized to warm-up the LED die 175 and the LED package 124. More rigorously, the integration of $I_f$ with respect to time, multiplied by the forward voltage over the interval represents the energy consumed during the high pulse current step 322. In the illustrated embodiment for a Panasonic model no. LNG992CF9 blue LED 120, the forward voltage over the 100 mA interval is five volts (5.0 V). Since the forward voltage is a constant, it has the effect of a scaling factor in this integration. Hence, the area under the $I_f$ curve may be altered by setting the peak current level 324, with the duration remaining a viable representation, albeit scaled by the forward voltage, of the energy necessary to warm-up the blue LED 120.

The accelerated illuminate response system 310 controls the amount of energy passing through the blue LED die 175, and this heating of the die in turn heats the LED package 124. The secondary increase 334 occurring in the output voltage $V_O$ of photodetector 130 after the two-second high pulse step 322, 332 is an attribute of this heating effect. In this method, the LED die 175 is actually heated beyond its DC equilibrium temperature, in an effort to quickly inject or force a high level of energy into the LED package 124. When the normal DC operating level is restored to the 30 mA level, the LED die 175 cools down to an equilibrium temperature and the light output 180 correspondingly increases, as shown at 334 in the graph of FIG. 16.

Figure 17:
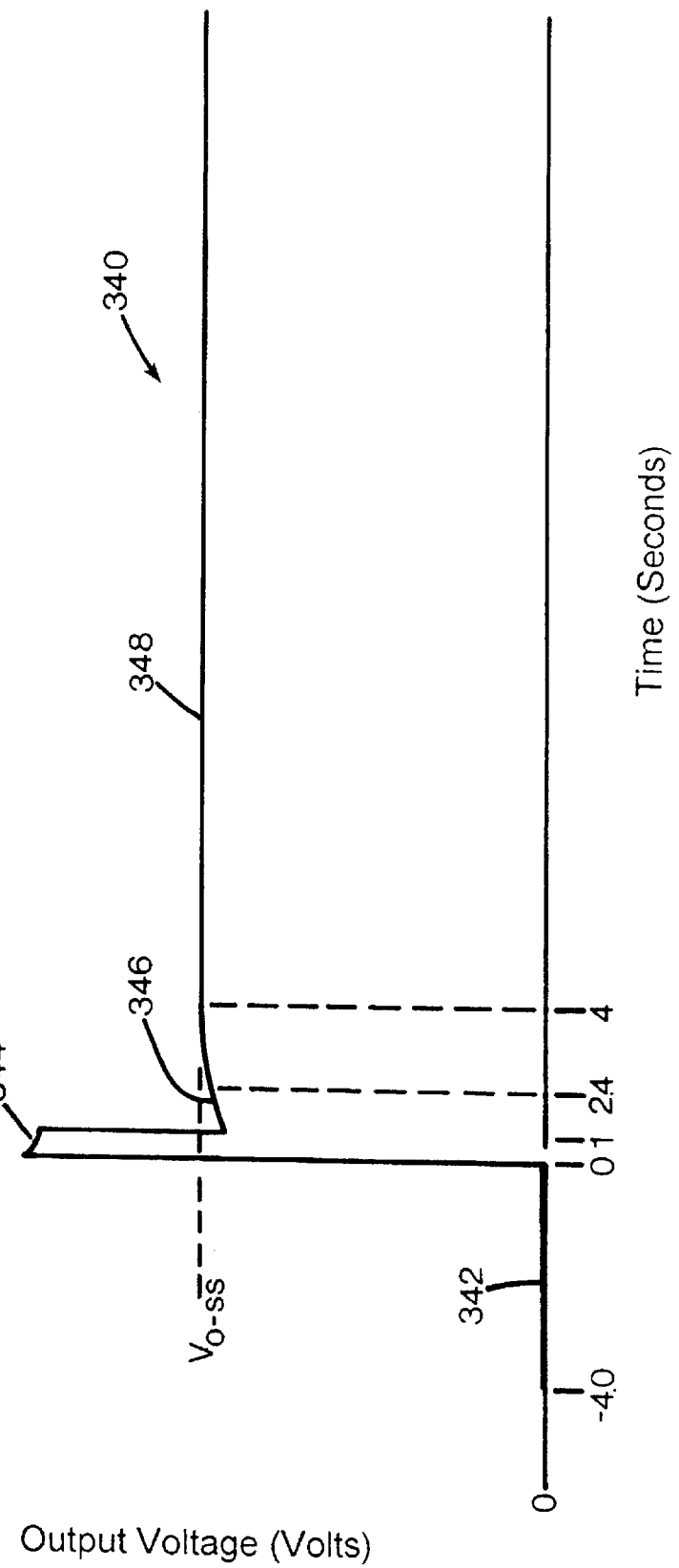
FIG. 17 is a graph of an under-heated illumination output of the sensor of FIG. 2.

The optimum duration of the peak voltage step 332 is obtained when the secondary illuminate increase 334 is critically damped. Too short of a duration causes the secondary increase 334 to take longer, resulting in an under-heated condition which unfortunately extends the overall warm-up time. This under-heated condition is shown by graph 340 in FIG. 17. The graph 340 shows an initial pre-warming illumination 342 which occurs at 40 seconds before initial start-up, similar to the low level illumination voltage 318 shown in FIG. 16. In this under-heated situation, the high pulse current step 322 lasts for only one second, so upon initiation of the pulse step 322, the illumination graph 340 shows a peak step or spike 344 which also lasts for only one second. Following this one second illumination spike 344, the output voltage of photodetector 130 then drops off before beginning to climb as a secondary illuminate increase or voltage droop section 346. As shown in FIG. 17, this rise 346 continues until the LED reaches a normal DC equilibrium temperature, resulting in portion 348 of the graph 340 where the output voltage $V_O$ has reached within 2% of the steady state value. The under-heated voltage droop 346 in FIG. 17 takes nearly four seconds longer to reach within 2% of the steady state value along portion 348 of the graph, which is a significant increase over the 2.4 seconds of droop 334 in FIG. 16 using a two-second duration high current pulse 324.

Figure 18:
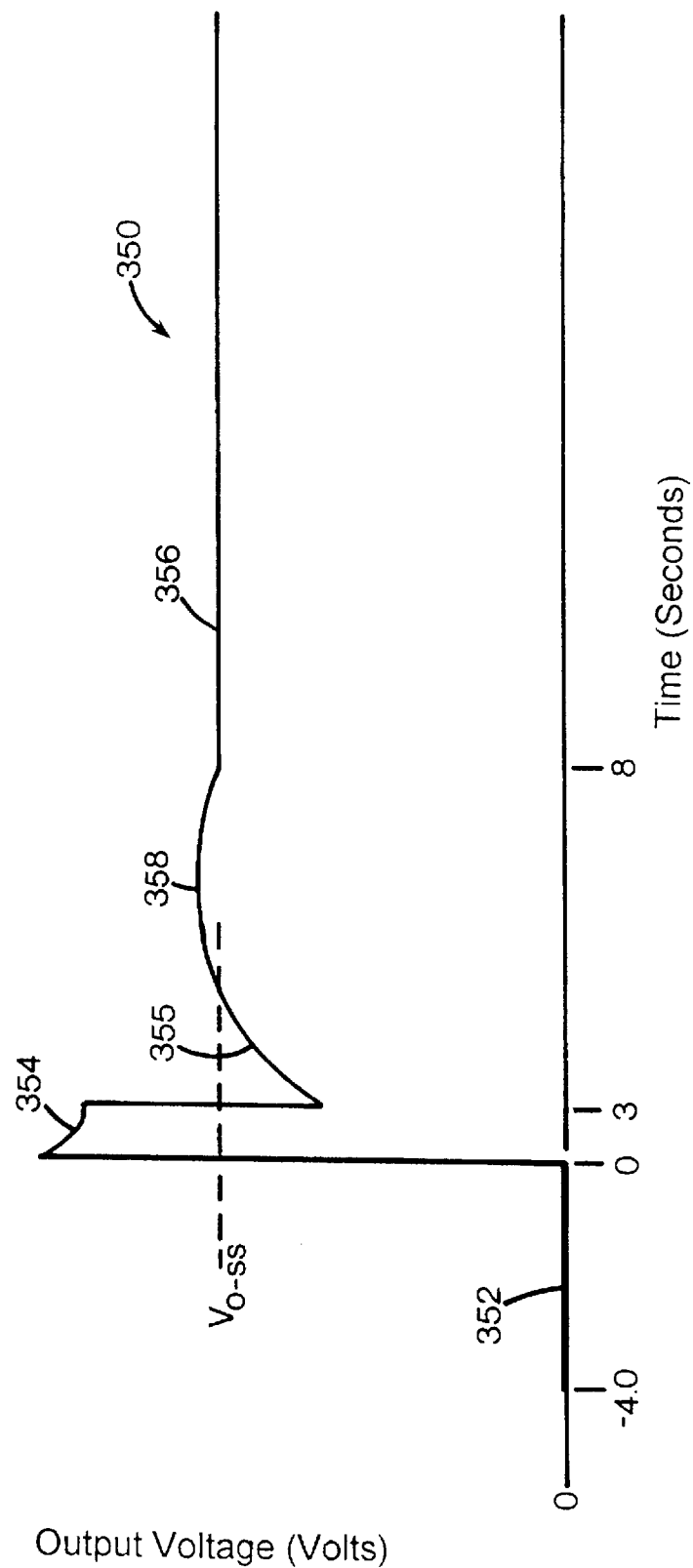
FIG. 18 is a graph of an over-heated illumination output of the sensor of FIG. 2.

While FIG. 17 illustrates an under-heated illumination condition, FIG. 18 is a graph of an over-heated illumination curve 350. Here, the graph 350 shows an initial pre-warming illumination 352, similar to the illumination levels 318 and 342 in FIGS. 16 and 17, respectively, all of 40 second durations corresponding to the 6 mA pre-warming current 314 in FIG. 15. At time t=0, a 100 mA forward current pulse is applied to the LED 120 for a duration of the three seconds in the high pulse current step 322, which generates an illumination spike or peak step 354 as measured by the photodetector 130. Upon completion of the high pulse current step 322, the normal drive current step 328 drops the forward current to the LED 120 to a value of 30 mA, as shown by the portion 330 of the graph in FIG. 15. The illumination peak 354 lasts for three seconds, after which it drops off as the normal drive current step 328 begins. Following this three second illumination spike 354, the output voltage $V_O$ of the photodetector 130 drops off before beginning to climb as a secondary illuminate increase or voltage droop section 355 of graph 350. Rather than quickly and gently approaching an illumination value within 2% of the steady state illumination, shown along portion 356 of graph 350, this voltage droop 355 continues to rise and overshoots the steady-state value, as shown by portion 358 graph 350. Thus, too long of a duration of the high pulse current step 322 causes an overshoot of the energy needed to heat the LED package 124, with the hump portion 358 of the graph indicating a time during which the package 124 must cool.

Thus, with some minor experimenting with duration levels for the pulsing step 322, and observation of the resulting illumination measured by the photodetector 130, the duration of the high pulse current step 322 may be optimized to provide a secondary illuminate increase which is critically damped, as shown in FIG. 16 at portions 334 of graph 316. Again, the magnitude of the high pulse current step 322, here illustrated as 100 mA in FIG. 15, may be obtained from the manufacturer's specification sheet for the particular LED being used. It is apparent that other magnitudes of pulse current may be used under the maximum value recommended by the manufacturer; however, using this maximum value helps achieve warm-up more quickly to speed the overall sensing process 210. It should also be understood that the pre-warming step 312 is optional in the accelerated illuminate response system 310, but use of the pre-warming step 312 achieves steady state illumination faster than without pre-warming. Indeed, other higher values of pre-warming current 314 may be used other than the 20% of normal drive current (6 mA in FIG. 15). $I_f$ a higher level of pre-warming current can be tolerated by the particular diode used, such a larger value results in further decreases in the total time required to reach steady state illumination 336 in FIG. 16.

Figure 19:
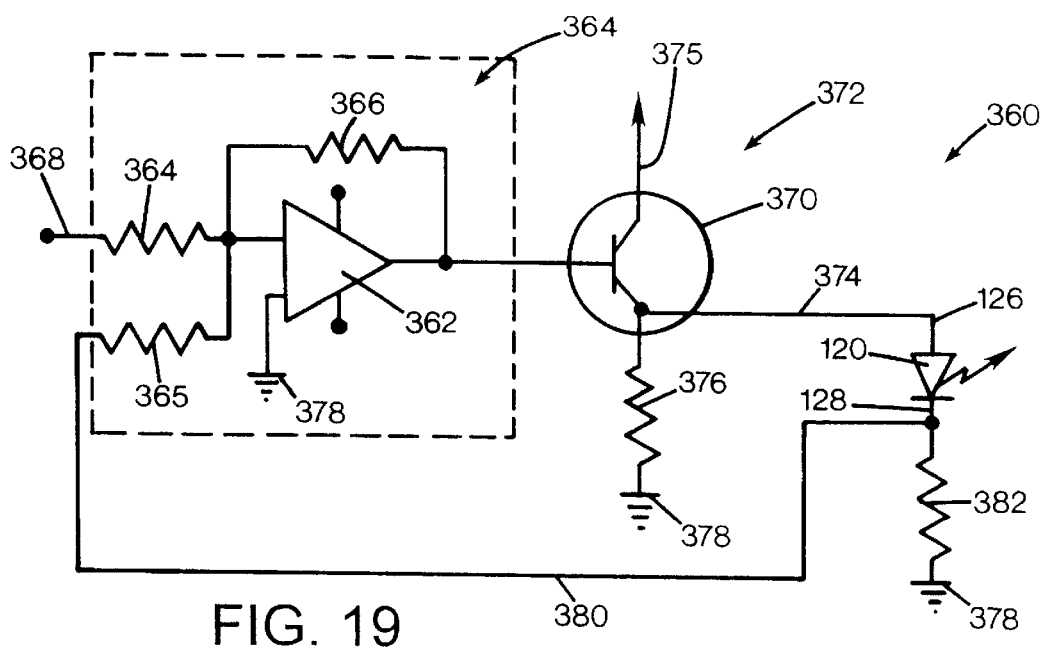
FIG. 19 is a schematic diagram of one form of a closed-loop current regulator for use with the sensor of FIG. 2.
Figure 20:
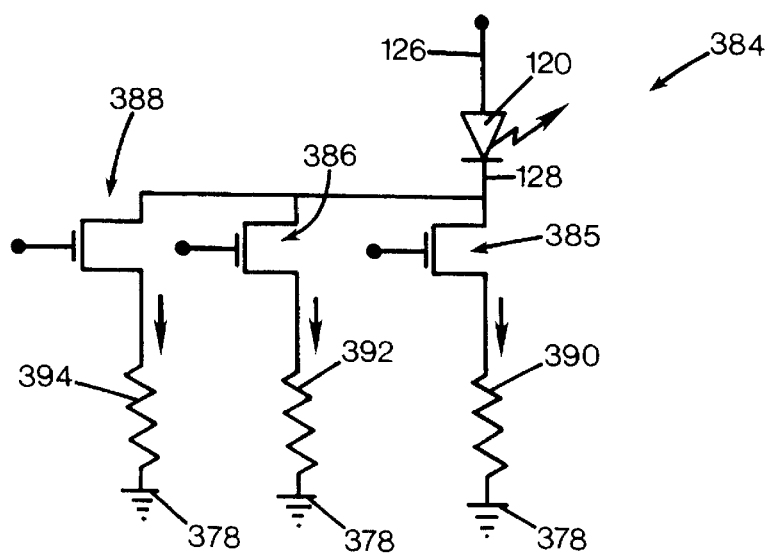
FIG. 20 is a schematic diagram of one form of an LED driver for use with the sensor of FIG. 2.

FIGS. 19 and 20 shown two different circuits for driving the blue LED 120 at the forward current profile 315 illustrated in FIG. 15. The circuit of FIG. 19 may be most helpful during initial prototype testing to establish the current levels and pulse duration of the forward current profile 315. Once the forward current profile 315 is understood for a particular brand and type of LED 120, then the circuit of FIG. 20 may be more preferable to incorporate in production units due to its relative simplicity and more economical construction.

More specifically, FIG. 19 is a schematic diagram of an LED driving circuit 360 shown coupled to drive the blue LED 120. The driving circuit 360 comprises a closed loop current regulator, including an operational amplifier 362 configured as a summing circuit 364. The particular operational amplifier illustrated is made by the Texas Instruments company and is sold as part no. VA741CP. The inputs to the operational amplifier 362 included two 100 kilo-ohm resistors 364 and 365, with a 10 mega-ohm feedback resistor 366 being used. The resistor 364 receives a negative voltage input 368, which may be supplied from a digital-to-analog converter ("DAC"). The negative voltage input 368 is preferably scaled at ten volts per ampere (10 V/A), and is used as a command input to the summing operational amplifier 364. The output of operational amplifier circuit 364 drives a bipolar transistor 370 coupled as an emitter amplifier 372 to supply a drive current 374 to the blue LED 120 via lead 126 (FIG. 7). The bipolar transistor 370 in the illustrated embodiment is manufactured by Motorola, and sold as part no. MPS-W06. The emitter amplifier 372 is biased with a positive voltage of 10 volts at lead 375, with a 10 kilo-ohm resistor 376 coupling the transistor to ground potential, here illustrated as ground 378. To provide a feedback signal 380 to the summing operational amplifier circuit 364, the circuit 360 includes a 10 ohm precision resistor 382 coupled between the output lead 128 of the LED 120 and ground 378. Thus, circuit 360 may be used to precisely regulate the forward current flow through LED 120 over a range of 0–100 mA, which may be particularly helpful in establishing the magnitudes and/or durations of the pre-warming step 312 and the high pulse current step 322.

FIG. 20 illustrates an alternate LED driver circuit 384, which drives the blue LED 120. For convenience, the LED 120 receives voltage from the same source driving one of the inkjet printheads 70–76, such as the black printhead 70 at a voltage of 6.9 volts, which is coupled to the LED input lead 126. The driver circuit 384 includes only three field effect transistors ("FETs") 385, 386 and 388. The inputs to each of these FETs 385–388 is coupled to controller 35 to trigger when during the forward current pulse each of these switches conducts. Using a 6.9 volt input, a 717 ohm resistor 390 used in series with the FET 385 to generate the 6 mA pre-warming current of step 312. For convenience, ground is also labeled as item 378 in FIG. 20. To achieve the 100 mA high current pulse of step 322, the second FET 386 is coupled in series with a 19 ohm resistor 392 to generate the 100 mA current spike 324 in FIG. 15. Finally, to generate the steady-state value of the normal driving current 330 in FIG. 15, a 105 ohm resistor 394 is coupled to the third FET 388 to produce the 30 mA normal drive current of step 328.

Conclusion

A. Monochromatic Optical Sensing System

Figure 12:
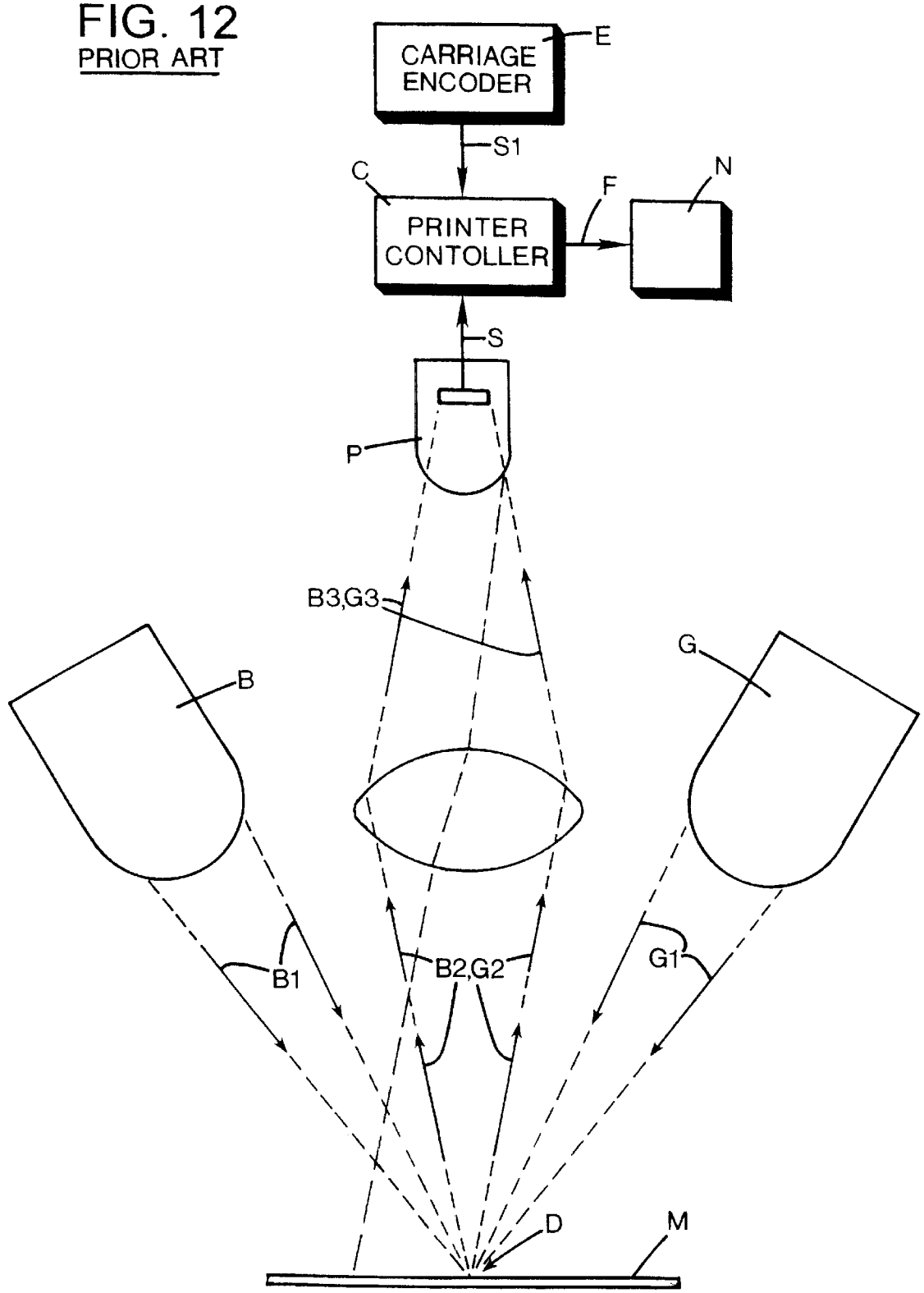
FIG. 12 is a schematic diagram illustrating the prior art monitoring system using the HP '002 optical sensor, discussed in the Background section above.

Advantageously, elimination of the green LED(s) required in earlier HP '002 and '014 sensors (see FIG. 12) reduces the direct material cost of the sensor by 25–45 cents per unit for the monochromatic optical sensor 100. Moreover, by eliminating the green LED, the sensor package is advantageously reduced in size by approximately 30% compared to the HP '002 sensor. The reduced size and weight of the monochromatic sensor 100 advantageously lightens the load carried by carriage 40 during scanning and printing. Furthermore, elimination of the green LED used in the earlier HP '002 and '014 sensors requires less cable routing between the controller 35 and the sensor 100. Additionally, by pulsing the blue LED 120 rather than leaving it on for the full scanning pass, advantageously provides a greater input signal level to the photodetector 130, which then allows simpler signal processing at a greater design margin than was possible with the earlier HP '002 and '014 sensors. Finally, assembly of the monochromatic optical sensor 100 is simpler than the earlier HP '002 and '014 sensors because fewer parts are required, and elimination of the green LED also eliminates the possibility of mis-assembly, where the blue and green LEDs could inadvertently be mounted in the wrong locations within the sensor packaging.

With the increased intensity provided by pulsing the blue LED, an intensity of up to approximately 3600 mcd is obtained using the blue LED 120, as compared to an intensity of 15 mcd produced by the earlier blue LEDs used in the HP '002 sensor. With this increased intensity of the monochromatic sensor 100, none of the signal enhancing techniques used in the earlier HP '002 and '014 sensors, such as a 100× amplifier, AC coupling of the output signal, and a ten-bit A/D converter, are all eliminated with monochromatic sensor 100. Indeed, the sensor 100 may be coupled directly to an A/D converter, which preferably occupies a portion of the application specific integrated circuit (ASIC) provided within the printer controller 35. Furthermore, by implementing a multiplexing signal transfer strategy between the sensor 100 and the controller 35, the cost of the A/D converter and the ASIC is further reduced.

Use of the defractive lens technology in constructing element 160, and optionally in element 168 of the lens assembly 110, advantageously decreases the overall size of the optical package of sensor 100. Further reductions in package size of the casing 102 and cover 104 are gained by eliminating the green LED, so the monochromatic sensor 100 is roughly 30% of the size of the HP '002 sensor (see FIG. 12), and approximately 70% the size of the of the HP '014 sensor, both described in the Background section above.

Furthermore, use of the monochromatic optical sensor 100 avoids the use of ink mixing to determine the location of some inks, as was practiced using the HP '014 sensor described in the Background section above. Now sensing of dot placement is no longer dependent upon the type of media used, because the monochromatic sensor 100 accurately registers the location of a droplet, whether placed on a high-gloss photographic quality paper, or a brown lunch sack, or any type of media in between. This is possible because the monochromatic sensor 100 detects the fundamental spectral properties of each of the primary colors, black, cyan, magenta and yellow.

Additionally, by pulsing LED 100 during the duty cycle, the blue LED may be driven at a higher current level during the LED on-time 274 in FIG. 10, and then allowed to cool during the remainder of the time between pulses of curve 266. Thus, the average current over time for the entire period is the same as the DC value, but the peak current during the on-segment 274 leads to a higher peak illumination when LED 120 is pulsed. Thus, pulsed operation of the blue LED 120 obtains greater illumination using a more economical LED, resulting in an energy savings as well as a material cost savings without sacrificing print quality, all of which benefit consumers.

B. Accelerated Illuminate Response System

As mentioned above, understanding the illuminate response as illustrated by FIGS. 13 and 14 is first needed before a manner of addressing this response could be conceived. From an electronic hardware viewpoint, the illuminate response is transparent. Upon application of a forward voltage $V_{CC}$ to the blue LED 120, the forward current $I_f$ rapidly responds. Initially, it would have been easy to make the assumption that the illumination 180 must have correspondingly changed as rapidly because light output 180 is directly related to the forward current $I_f$; however, this relationship between the forward current $I_f$ and the resulting illumination holds true only under steady-state thermal conditions. This was the discovery not mentioned in the manufacturer's LED specifications because typically LEDs are designed as indicators or as pseudo-static pixel elements in a larger display array. The transient illuminate response is irrelevant for these typical LED applications. Indeed, it is very difficult to notice this transient illuminate response variation with the human eye because the human visual response is fairly insensitive to subtle variations in intensity. To realize the relationship that the LED electronic driver 360, 384 has in the illuminate response of LED 120, not just the forward current $I_f$, but also illumination had to be observed and studied during the initial turn-on time of the LED.

The photodetector 130 measures the light intensity 200 reflecting off the media 170, and the photodetector 130 readily captures the transient illumination which needed to be eliminated to shorten the overall test time. However, this transient illumination was not apparent because state-of-the-art scanning systems in inkjet printing mechanisms print extensive test patterns before beginning scanning. As mentioned above, the earlier '002 and '014 HP sensors were turned on as these test patterns started printing, allowing the sensors to warm up to their steady state illuminate output values during the test pattern printing routine. Moreover, in these earlier systems the photodetector output was not even sampled until after the test patterns were completely printed and the LEDs had reached steady-state illumination, so there was no reason to even suspect that this illumination transient existed.

Another difficulty encountered in studying the transient illumination response and understanding this phenomenon was caused by the print media itself. The surface of the print media 170 can cause variations in illuminate intensity, due to minor surface roughness, and variations in the reflectance of the individual media fibers. If the voltage output $V_{OO}$ of the photodetector 130 was sampled while printing a test page (or an operator's normal print job), when the photodetector 120 was still warming up and the printhead carriage 40 was moving, then the variation due to the localized reflectance differences in the media 170 became embedded in the output signal $V_O$, which further served to mask the effects of the thermal illumination transient.

A variety of advantages are realized using the accelerated illuminate response system 310, and particularly a scanning capacity, such as used in an inkjet printing mechanism. First, system 310 reduces the time required for the LED 120 to reach illuminate equilibrium on the order of 88% less than using the monitoring system 210 without system 310. Additionally, system 310 diminishes the warm-up time sufficiently to enable completion of the warm-up cycle during the processes of printing a calibration or test page as set forth in step 216 of FIG. 9. Using the system described herein, the illuminate response is no longer on a critical path of the time required to process, that is to print and monitor, the entire test page. Thus, consumers may have a better out-of-the-box experience when first using their new printer 20 because the initial test routine 210 was enhanced by the faster processing realized by using the accelerated illuminate response system 310.

Thus, the sensing system 100 may now be used not only on high-end printers and plotters for commercial use, but also in printers designed for industry, for the office and for the home. The faster response realized using the accelerated illuminate response system 310, allow rapid sampling of a dedicated test page, as well as the possibility of sampling an operator's normal print job. Thus, consumers receive a robust printing mechanism that delivers high quality images both quickly and efficiently.

I claim:

1. A method of illuminating a light emitting diode, comprising the steps of:
    applying a high current pulse to the light emitting diode for a selected duration to illuminate the diode;
    after the selected duration, driving the light emitting diode with a normal drive current; and
    after the selected duration, enduring a secondary illuminate response until illumination of the light emitting diode reaches a selected illumination value.

2. A method according to claim 1 wherein the selected duration of the applying step comprises a time selected to minimize the time of the secondary illuminate response of the enduring step.

3. A method according to claim 1 wherein after the selected duration, illumination of the light emitting diode drops to an intermediate illumination value at the beginning of the enduring step.

4. A method according to claim 1 wherein the high current pulse of the applying step comprises a current level of three to four times the normal drive current.

5. A method according to claim 1 wherein:
    the normal drive current of the driving step comprises a value that illuminates the light emitting diode at a steady state illumination value after the light emitting diode reaches a thermal equilibrium; and
    the selected illumination value of the enduring step comprises a value within 5% of the steady state illumination value.

6. A method according to claim 5 wherein the selected illumination value of the enduring step comprises a value within a range of 1–3% of the steady state illumination value.

7. A method according to claim 1 further including the step of, before the applying step, pre-warming the light emitting diode by driving the light emitting diode with a pre-warming current for a pre-warming duration.

8. A method according to claim 7 further including the steps of:
    determining a cold start time by driving the light emitting diode with the normal drive current without first conducting the applying step, with the cold start time extending from the beginning of the driving step until the illumination of the light emitting diode reaches the selected illumination value; and
    assigning the pre-warming duration of the pre-warming step a length of time at least as long as the cold start time.

9. A method according to claim 8 wherein the pre-warming duration is at least twice as long as the cold start time.

10. A method according to claim 7 wherein a value of the pre-warming current of the pre-warming step comprises 5–30% of the normal drive current.

11. A method according to claim 7 wherein a value of the pre-warming current of the pre-warming step comprises 15–25% of the normal drive current.

12. A method according to claim 1 further including the step of determining the selected duration of the applying step by:
    choosing an expected duration;
    applying the high current pulse to the light emitting diode for the expected duration;
    following the driving step, observing the duration of the secondary illuminate response of the enduring step;
    repeating the selecting step and the observing step until finding a minimum time value for the enduring step; and
    assigning the minimum time value to the selected duration.

13. A method according to claim 1 wherein:
    the high current pulse of the applying step comprises a current level of three to four times the normal drive current;
    the normal drive current of the driving step comprises a value that illuminates the light emitting diode at a steady state illumination value after the light emitting diode reaches a thermal equilibrium; and
    the selected illumination value of the enduring step comprises a value within 5% of the steady state illumination value; and
    the method further includes the step of, before the applying step, pre-warming the light emitting diode by driving the light emitting diode with a pre-warming current for a pre-warming duration.

14. A method according to claim 13 further including the steps of, before the applying step:
    determining a cold start time by driving the light emitting diode with the normal drive current without first conducting the applying step, with the cold start time extending from the beginning of the driving step until the illumination of the light emitting diode reaches the selected illumination value, and assigning the pre-warming duration of the pre-warming step is at least as long as the cold start time; and
    determining the selected duration of the applying step by:
        choosing an expected duration;
        applying the high current pulse to the light emitting diode for the expected duration;
        following the driving step, observing the duration of the secondary illuminate response of the enduring step;
        repeating the selecting step and the observing step until finding a minimum time value for the enduring step; and
        assigning the minimum time value to the selected duration.

15. An optical sensing system for sensing ink droplets printed on media by an inkjet printing mechanism, comprising:
    a light emitting diode directed to illuminate selected portions of the media in response to a drive signal;
    a photodetecting element directed to receive light reflected from the illuminated selected portions of the media, wherein the photodetecting element generates an output signal having an amplitude proportional to the reflectance of the media at the illuminated selected portions; and
    a driver that generates the drive signal to apply a high current pulse to the light emitting diode for a selected duration, and thereafter to apply a normal drive current to the light emitting diode during a secondary illuminate response until illumination of the light emitting diode reaches a selected illumination value while sensing said ink droplets.

16. An optical sensing system according to claim 15 wherein the light emitting diode comprises a single monochromatic illuminating element.

17. An optical sensing system according to claim 15 wherein the driver generates the drive signal to apply a pre-warming current of a magnitude of less than half of the normal drive current to the light emitting diode before applying the high current pulse.

18. An inkjet printing mechanism, comprising:
- a media handling system that advances media through a printzone;
- a carriage that reciprocates an inkjet printhead across the printzone to selectively deposit ink droplets on the media;
- an optical sensor supported by the carriage for scanning across the printzone, with the optical sensor including:
  - a light emitting diode directed to illuminate selected portions of the media in response to a drive signal;
  - a photodetecting element directed to receive light reflected from the illuminated selected portions of the media wherein the photodetecting element generates an output signal having an amplitude proportional to the reflectance of the media at the illuminated selected portions; and
  - a driver that generates the drive signal to apply a high current pulse to the light emitting diode for a selected duration, and thereafter to apply a normal drive current to the light emitting diode during a secondary illuminate response until illumination of the light emitting diode reaches a selected illumination value while sensing said ink droplets; and
- a controller which compares the reflectance signal to a set of reference values to make a determination about the ink droplets deposited on the media.

19. An inkjet printing mechanism according to claim 18 wherein the light emitting diode comprises a single monochromatic illuminating element.

20. An inkjet printing mechanism according to claim 18 wherein the driver generates the drive signal to apply a pre-warming current of a magnitude of less than half of the normal drive current to the light emitting diode before applying the high current pulse.

* * * * *